(12) United States Patent
Yamashita et al.

(10) Patent No.: US 11,332,140 B2
(45) Date of Patent: May 17, 2022

(54) STEERING SYSTEM

(71) Applicant: Toyota Jidosha Kabushiki Kaisha, Toyota (JP)

(72) Inventors: Masaharu Yamashita, Toyota (JP); Shoji Kubota, Miyoshi (JP); Masataka Okuda, Toyota (JP); Yosuke Yamashita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 16/537,878

(22) Filed: Aug. 12, 2019

(65) Prior Publication Data
US 2020/0047764 A1 Feb. 13, 2020

(30) Foreign Application Priority Data
Aug. 13, 2018 (JP) .............................. JP2018-152467

(51) Int. Cl.
*B60W 30/00* (2006.01)
*B60W 30/18* (2012.01)
(Continued)

(52) U.S. Cl.
CPC ................. *B60W 30/18145* (2013.01); *B60R 16/0231* (2013.01); *B60T 8/246* (2013.01);
(Continued)

(58) Field of Classification Search
CPC ......... B60W 30/18145; B60W 10/184; B60W 10/20; B60W 2520/10; B60W 2710/182;
(Continued)

(56) References Cited

U.S. PATENT DOCUMENTS

| 10,351,162 B1 * | 7/2019 | Katzourakis | ........... B62D 5/005 |
| | | | 180/253 |
| 2006/0200289 A1 | 9/2006 | Chino | |
| 2014/0195123 A1 | 7/2014 | Nishikawa et al. | |
| 2016/0325721 A1 | 11/2016 | Jonasson et al. | |

(Continued)

FOREIGN PATENT DOCUMENTS

| CN | 106125722 A | 11/2016 |
| DE | 10053335 A1 | 5/2002 |

(Continued)

OTHER PUBLICATIONS

Dr. Juan R. Pimentel, An Architecture for a Safety-Critical Steer-by-Wire System, Society of Automotive Engineers, Inc., 2004 (Year: 2004).*

*Primary Examiner* — Russell Frejd
*Assistant Examiner* — Brittany Renee Peko
(74) *Attorney, Agent, or Firm* — Dinsmore & Shohl LLP

(57) ABSTRACT

A steer-by-wire steering system, including: a two-system reaction force applying device including two reaction force controllers and configured to obtain operation information and apply an operation reaction force; a two-system steering device including two steering controllers and configured to steer a wheel; an operation information obtaining device; an auxiliary steering device capable of changing a direction of a vehicle; two dedicated communication lines one of which information-transmittably and information-receivably connects one of the two reaction force controllers and one of the two steering controllers to each other, and the other of which information-transmittably and information-receivably connects the other of the two reaction force controllers and the other of the two steering controllers to each other; and a first communication bus to which the operation information obtaining device is at least information-transmittably connected and to which the two steering controllers and the (Continued)

auxiliary steering device are at least information-receivably connected.

17 Claims, 7 Drawing Sheets

(51) Int. Cl.
| | |
|---|---|
| B60R 16/023 | (2006.01) |
| B60T 8/24 | (2006.01) |
| B60W 10/184 | (2012.01) |
| B60W 10/20 | (2006.01) |
| B62D 5/04 | (2006.01) |

(52) U.S. Cl.
CPC ......... B60W 10/184 (2013.01); B60W 10/20 (2013.01); B62D 5/0463 (2013.01); *B60T 2201/16* (2013.01); *B60W 2520/10* (2013.01); *B60W 2710/182* (2013.01); *B60W 2710/20* (2013.01)

(58) Field of Classification Search
CPC ............ B60W 2710/20; B60R 16/0231; B60T 8/246; B60T 2201/16; B62D 5/0463
See application file for complete search history.

(56) References Cited

U.S. PATENT DOCUMENTS

| | | | |
|---|---|---|---|
| 2017/0019290 A1* | 1/2017 | Armbruster | H04L 41/0631 370/216 |
| 2018/0178835 A1* | 6/2018 | Toko | B62D 5/0484 |
| 2019/0100237 A1* | 4/2019 | Klesing | B62D 5/0484 701/43 |
| 2019/0126971 A1* | 5/2019 | Kim | B62D 5/006 701/41 |
| 2019/0135336 A1* | 5/2019 | Jeong | B62D 5/0475 |
| 2019/0165631 A1* | 5/2019 | Horizumi | H02K 3/28 310/68 |
| 2021/0009193 A1* | 1/2021 | Ooba | B62D 5/0418 701/41 |
| 2021/0016825 A1* | 1/2021 | Miura | B62D 5/0493 701/41 |
| 2021/0129831 A1* | 5/2021 | Hecker | B60W 30/02 701/23 |

FOREIGN PATENT DOCUMENTS

| | | |
|---|---|---|
| EP | 1698539 A1 | 9/2006 |
| JP | 2004-338563 A | 12/2004 |
| JP | 2009-262609 A | 11/2009 |
| JP | 2013-039892 A | 2/2013 |
| JP | 5805255 B1 | 9/2015 |
| JP | 2015-199398 A | 11/2015 |

* cited by examiner

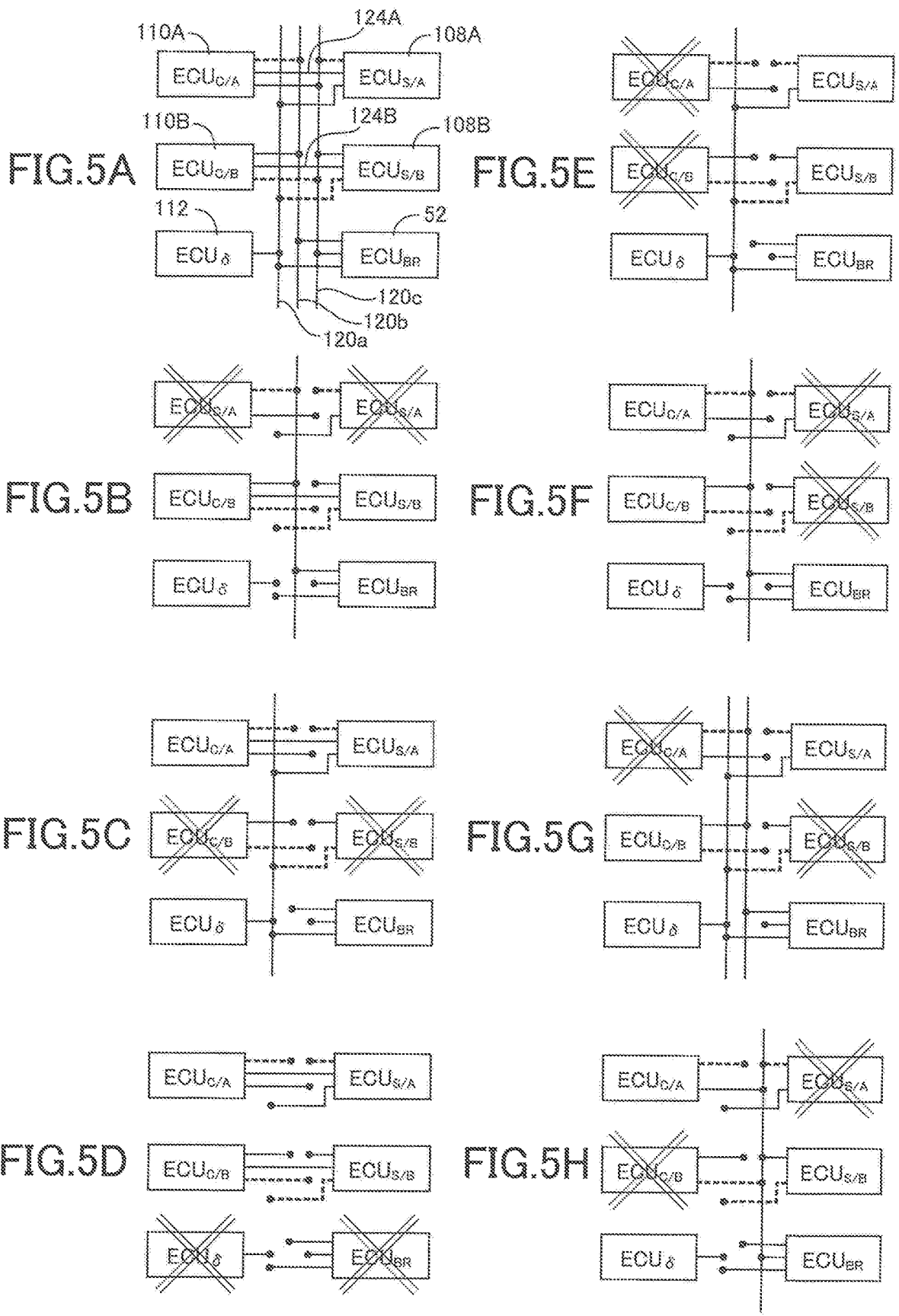

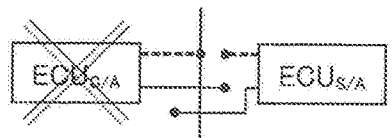
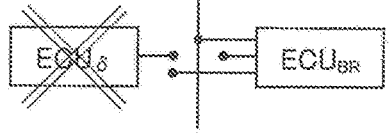
FIG.6I
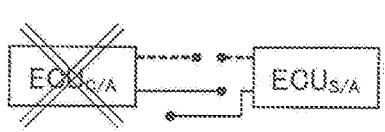
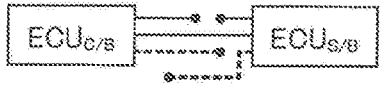
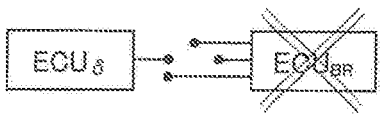
FIG.6M
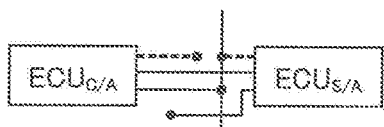
FIG.6J
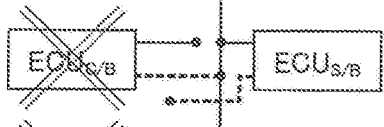
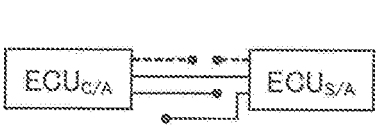
FIG.6N
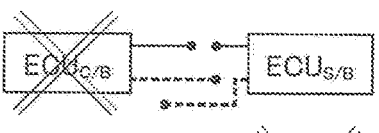
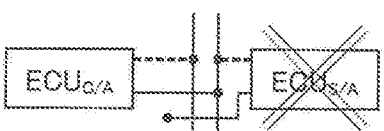
FIG.6K
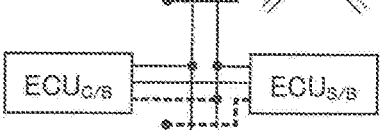
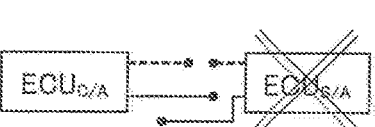
FIG.6O
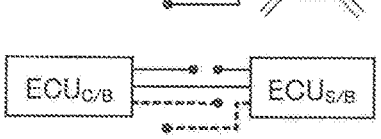
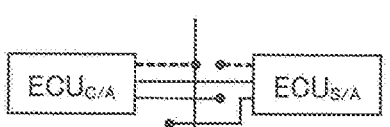
FIG.6L
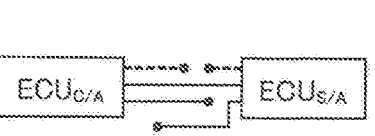
FIG.6P

STEERING SYSTEM

CROSS REFERENCE TO RELATED APPLICATION

The present application claims priority to Japanese Patent Application No. 2018-152467, which was filed on Aug. 13, 2018, the disclosure of which is herein incorporated by reference in its entirety.

BACKGROUND

Technical Field

The following disclosure relates to a steer-by-wire steering system installed on vehicles.

Description of Related Art

A vehicle steering system configured to steer wheels without depending on an operation force by a driver, namely, what is called steer-by-wire steering system, has been actively studied in recent years. A steering system disclosed in Japanese Patent Application Publication No. 2009-262609 is one example of the steer-by-wire steering system. A steering device of the disclosed steering system includes two systems in consideration of an occurrence of an electrical failure. Further, the disclosed steering system is equipped with a backup mechanism for transmitting, through a cable, the operation force by the driver to the steering device.

SUMMARY

For constructing a practical steer-by-wire steering system having a failsafe function for coping with an electrical failure, it is desirable that the system have further redundancy. Further redundancy of the system, however, inevitably needs elaborate configuration in communication among controllers of the system. Accordingly, one aspect of the present disclosure is directed to a steer-by-wire steering system having high utility.

According to one aspect of the disclosure, a steer-by-wire steering system includes a two-system reaction force applying device so as to provide two operation information obtaining systems each of which is a system for obtaining the operation information and includes a two-system steering device so as to provide two wheel-steering systems. Further, an operation information obtaining device is provided as an auxiliary operation information obtaining system, independently of the reaction force applying device. Further, an auxiliary steering device for changing a direction of the vehicle is provided as an auxiliary wheel-steering system. In this configuration, one of two controllers of the reaction force applying device that correspond to the two systems and one of two controllers of the steering device that correspond to the two systems are connected by one dedicated communication line. Similarly, the other of the two controllers of the reaction force applying device and the other of the two controllers of the steering device are connected by another dedicated communication line. The present steer-by-wire steering system further includes a communication bus to which the operation information obtaining device is at least information-transmittably connected and the two controllers of the steering device and the auxiliary steering device are at least information-receivably connected.

The vehicle steering system constructed as described above includes the three operation information obtaining systems and the three wheel-steering systems. In other words, the operation information obtaining systems and the wheel-steering systems are both three redundant systems. Even when an electrical failure occurs in two of the six systems (as a sum of the three operation information obtaining systems and the three wheel-steering systems), the configuration of the dedicated communication lines and the communication bus described above makes it possible to change the direction of the vehicle by at least one wheel-steering system based on the operation information obtained in at least one operation information obtaining system. Thus, the present disclosure allows construction of a practical vehicle steering system that is excellent in terms of failsafe.

Various Forms

There will be exemplified and explained various forms of the present disclosure. Each of the forms is numbered and depends from the other form or forms, where appropriate. This is for easier understanding of the forms of the present disclosure, and it is to be understood that combinations of constituent elements that constitute the present disclosure are not limited to those described in the following forms. That is, it is to be understood that the present disclosure shall be construed in the light of the following description of various forms and embodiments. It is to be further understood that, as long as the present disclosure is construed in this way, any form in which one or more constituent elements is/are added to or deleted from any one of the following forms may be considered as one form of the present disclosure.

(1) A steer-by-wire steering system, including:
an operation member to be operated by a driver;
a two-system reaction force applying device including two reaction force controllers corresponding to two systems, the reaction force applying device being configured to, in each of the two systems, obtain operation information that is information relating to an operation degree of the operation member and apply an operation reaction force to the operation member based on the operation information;
a two-system steering device including two steering controllers corresponding to two systems, the steering device being configured to, in each of the two systems, steer a wheel based on the operation information;
an operation information obtaining device configured to obtain the operation information independently of the reaction force applying device;
an auxiliary steering device capable of changing a direction of a vehicle on which the steer-by-wire steering system is installed, independently of the steering device;
two dedicated communication lines one of which information-transmittably and information-receivably connects one of the two reaction force controllers and one of the two steering controllers to each other, and the other of which information-transmittably and information-receivably connects the other of the two reaction force controllers and the other of the two steering controllers to each other; and
a first communication bus to which the operation information obtaining device is at least information-transmittably connected and to which the two steering controllers and the auxiliary steering device are at least information-receivably connected.

This form is a basic form of the present disclosure. Each of the two systems of the reaction force applying device and the operation information obtaining device constitutes a system for obtaining the operation information, namely, an operation information obtaining system. Thus, the vehicle steering system of this form includes three operation information obtaining systems. Similarly, each of the two systems of the steering device, and the auxiliary steering device constitutes a system for steering the wheel or for changing a direction of the vehicle, namely, a wheel-steering system. Thus, the vehicle steering system of this form includes three wheel-steering systems. In the vehicle steering system of this form, the controller of one of the two systems of the reaction force applying device and the controller of one of the two systems of the steering device are connected by one dedicated communication line while the controller of the other of the two systems of the reaction force applying device and the controller of the other of the two systems of the steering device are connected by another dedicated communication line. Further, the operation information from the operation information obtaining device that functions as an auxiliary operation information obtaining system is transmittable through the communication bus to the controllers of the respective two systems of the steering device and the auxiliary steering device that functions as an auxiliary wheel-steering system. Even if any two systems among the six systems, i.e., among the three operation information obtaining systems and the three wheel-steering systems, suffer from an electrical failure (though such an event is unlikely to happen actually), steering is ensured by at least one wheel-steering system based on the operation information sent from at least one operation information obtaining system. Here, "steering" is a concept including changing a direction of the wheel and changing a direction of the vehicle.

The "operation member" in this form includes not only ordinary steering wheels but also joysticks and the like. The "operation information" is information relating to an operation degree of the operation member. The "operation degree" is typically an operation amount of the operation member such as an operating angle from a neutral position. The operation degree may be any other physical amount usable in the control of steering. For instance, the operation degree includes an operation force applied to the operation member by the driver, an operation speed of the operation member, and so on.

The "operation information obtaining device" in this form may be regarded as an alternative to an operation degree obtaining means of the reaction force applying device. In the case where the reaction force applying device includes three systems, the operation information obtaining device may be constituted by one of the three systems that is different from the above-indicated two systems. However, the operation information obtaining device is desirably a device independent of the reaction force applying device for the reason that such an independent device is unlikely to be influenced by the electrical failure in the reaction force applying device. Specifically, the operation degree obtaining means of the reaction force applying device may be constituted as follows, for instance. In the case where the reaction force applying device uses an electric motor as a source of the reaction force, the reaction force controller may be configured to obtain the operation information based on a motor rotation angle of the electric motor, whereby the operation degree obtaining means is constituted. In contrast, the operation information obtaining device may be configured to directly obtain the operation degree of the operation member.

In the case where the steering device includes three systems, the "auxiliary steering device" in this form may be constituted by one of the three systems that is different from the above-indicated two systems. It is, however, desirable that the auxiliary steering device be a device capable of changing a direction of the vehicle even when the steering device totally fails to operate. Conversely, the auxiliary steering device may be a device that exerts the function of changing the direction of the vehicle only when the steering device totally fails to operate. As later explained, a brake system of the vehicle can change the direction of the vehicle by applying, to right and left wheels, mutually different magnitudes of a braking force. Thus, the brake system can be the auxiliary steering device.

(2) The steer-by-wire steering system according to the form (1), wherein at least one of the two steering controllers is information-untransmittably connected to the first communication bus.

Each reaction force controller and each steering controller are typically constituted by a computer and drive circuits for devices (such as a drive source, an actuator, and so on), and the computer performs communication. Each of the operation information obtaining device and the auxiliary steering device includes a controller. The controller includes a computer, and the computer performs communication. A failure of the controller includes a failure of the computer. In the case where the computer suffers from a failure, a disordered transmission phenomenon is expected to occur as later explained in detail. In the disordered transmission phenomenon, the computer discharges or drains massive amounts of meaningless information. In the case where the computer is connected to the communication bus such that the computer can feed information into the communication bus, the failure of the computer that involves the disordered transmission phenomenon may cause malfunction of the communication bus due to the massive amounts of meaningless information fed thereinto. According to this form, one or two steering controllers are configured not to feed information into the first communication bus. Thus, even when the steering controller/controllers suffer from the failure that involves the disordered transmission phenomenon, this form makes it possible to prevent malfunction of the first communication bus due to the failure.

(3) The steer-by-wire steering system according to the form (1) or (2), further including a second communication bus to which each of the two reaction force controllers and the auxiliary steering device are connected.

(4) The steer-by-wire steering system according to the form (3), wherein at least one of the two reaction force controllers is information-untransmittably connected to the second communication bus.

According to the steering system of the above two forms, the operation information obtained by one of the two reaction force controllers can be used in the steering performed by the auxiliary steering device. Further, information that flows through the second communication bus can be used in the control of the operation reaction force by each of the two reaction force controllers. According to the latter form, the second communication bus can keep functioning or working even when the electric failure that involves the disordered transmission phenomenon occurs in at least one reaction force controller that is information-untransmittably connected to the second communication bus.

(5) The steer-by-wire steering system according to any one of the forms (1) through (4), further including a third communication bus to which each of the two reaction force controllers, each of the two steering controllers, and the auxiliary steering device are connected.

(6) The steer-by-wire steering system according to the form (5), wherein at least one of: at least one of the two reaction force controllers; and at least one of the two steering controllers is information-untransmittably connected to the third communication bus.

The above two forms allow communication between the reaction force controller and the steering controller that are not connected by the dedicated communication line. Thus, even when the dedicated communication line does not function or work, the operation information obtained by the reaction force controller can be used in the control of the steering by the steering controller, and the steering information (that will be later explained) obtained by the steering controller can be used in the control of the operation reaction force by the reaction force controller. Moreover, by using information received via the third communication bus, each reaction force controller can execute the reaction force control, and each steering controller can execute the steering control. According to the latter of the above two forms, even when the controller that is information-untransmittably connected to the third communication bus suffers from the failure that involves the disordered transmission phenomenon, the function of the third communication bus can be maintained.

(7) The steer-by-wire steering system according to any one of the forms (1) through (6), further including: a second communication bus to which each of the two reaction force controllers and the auxiliary steering device are connected; and a third communication bus to which each of the two reaction force controllers, each of the two steering controllers, and the auxiliary steering device are connected,
wherein one of the two steering controllers is information-untransmittably connected to the first communication bus and information-transmittably and information-receivably connected to the third communication bus while the other of the two steering controllers is information-transmittably and information-receivably connected to the first communication bus and information-untransmittably connected to the third communication bus, and
wherein one of the two reaction force controllers is information-untransmittably connected to the second communication bus and information-transmittably and information-receivably connected to the third communication bus while the other of the two reaction force controllers is information-transmittably and information-receivably connected to the second communication bus and information-untransmittably connected to the third communication bus.

This form is a specific form relating to a steering system of the present embodiment that will be later explained. The action and merits of the steering system will be described in "THE DETAILED DESCRIPTION".

(8) The steer-by-wire steering system according to any one of the forms (1) through (7), wherein the auxiliary steering device is a brake system installed on the vehicle on which the steer-by-wire steering system is installed and capable of applying a braking force to right and left wheels independently of each other.

This form is a form to which specific features are added to the auxiliary steering device. In this form, an external system functions as the auxiliary steering device. The direction of the vehicle can be changed by respectively applying, to the right and left wheels, braking forces having mutually different magnitudes. Thus, the brake system can steer the vehicle in emergency circumstances under which the steering device fails to operate. In this sense, the brake system can be an emergency steering device.

(9) The steer-by-wire steering system according to any one of the forms (1) through (8),
wherein the two-system steering device is configured to, in each of the two systems, obtain steering information that is information relating to a steering degree of the wheel, and
wherein the two-system reaction force applying device is configured to, in each of the two systems, control the operation reaction force based on the steering information.

The "steering information" in this form is information relating to a steering degree. The "steering degree" includes a force required for the steering (i.e., a steering load), a speed of the steering, etc., in addition to a steering amount of the wheel. Execution of the control of the operation reaction force by the reaction force controller based on the steering load enables the driver to feel the load. In the case where the steering information is transmittable from the steering controller to the reaction force controller via the communication bus, the control of the operation reaction force based on the steering information is executable even in the event of a failure in which the dedicated communication line does not function or work.

(10) The steer-by-wire steering system according to any one of the forms (1) through (9), wherein the two-system reaction force applying device is configured to, in each of the two systems, control the operation reaction force based on vehicle speed information that is information relating to a running speed of the vehicle on which the steer-by-wire steering system is installed.

According to the steering system of this form, when the vehicle running speed is high, the operation reaction force is made large to thereby prevent an excessive steering operation by the driver, so as to enhance the stability of the vehicle in straight-ahead running, for instance. On the other hand, when the vehicle running speed is low, the operation reaction force is made small so as to allow easy steerability or good maneuverability by the driver.

(11) The steer-by-wire steering system according to any one of the forms (1) through (10), the two-system steering device is configured to, in each of the two systems, control a steering degree of the wheel based on the vehicle speed information that is information relating to the running speed of the vehicle on which the steer-by-wire steering system is installed.

The steering degree includes the steering amount of the wheel. According to the steering system of this form, when the vehicle running speed is high, a ratio between the operation amount of the operation member and the steering amount of the wheel (hereinafter referred to as "steering ratio" where appropriate) is made small so as to enhance the running stability of the vehicle, for instance. On the other hand, when the vehicle running speed is low, the steering ratio is made large so as to enhance the turning ability of the vehicle.

(12) The steer-by-wire steering system according to the form (10) or (11), which is configured such that the vehicle speed information flows through the first communication bus.

(13) The steer-by-wire steering system according to any one of the forms (10) through (12), further comprising a second communication bus to which each of the two reaction force controllers and the auxiliary steering device are connected, the steer-by-wire steering system being configured such that the vehicle speed information flows through the second communication bus.

(14) The steel-by-wire steering system according to any one of the forms (10) through (13), further comprising a third communication bus to which each of the two reaction force controllers, each of the two steering controllers, and the auxiliary steering device are connected, the steer-by-wire steering system being configured such that the vehicle speed information flows through the third communication bus.

According to the steering system of the above three forms, the vehicle speed information is received by at least one of: the reaction force controllers; and the steering controllers via any one of the communication buses. In the case where the vehicle speed, information is arranged to flow through a plurality of communication buses, at least one of: the reaction force controllers; and the steering controllers; can obtain the vehicle speed information through a certain communication bus that is functioning even if any one of the communication buses does not function.

(15) The steer-by-wire steering system according to any one of the forms (10) through (14), wherein the vehicle speed information contains information sent from a brake system installed on the vehicle on which the steer-by-wire steering system is installed.

(16) The steer-by-wire steering system according to any one of the forms (10) through (15), wherein the vehicle speed information contains information sent from a vehicle drive system installed on the vehicle on which the steer-by-wire steering system is installed.

Ordinary brake systems include a wheel speed sensor for detecting a rotational speed of the wheel. Further, a vehicle drive system installed on hybrid vehicles often include a rotational speed sensor for detecting a rotational speed of the engine and a rotational speed sensor for detecting a rotational speed of the electric motor. In the above two forms, the vehicle speed information sent from at least one of the brake system and the vehicle drive system flows through the communication buses. In the case where the vehicle speed information sent from both the brake system and the vehicle drive system is arranged to flow through the communication buses, the vehicle speed information sent from one of the brake system and the vehicle drive system can be used by at least one of: the reaction force controllers; and the steering controllers even when the vehicle speed information does not flow from the other of the brake system and the vehicle drive system.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIG. 5A is a schematic view for explaining a communication state among the electronic control units of the steering system according to the embodiment in the case where none of the electronic control units are in failure;

FIG. 5B is a schematic view for explaining a communication state among the electronic control units of the steering system according to the embodiment in the case where the one of the two electronic control units of the reaction force applying device and the one of the two electronic control units of the steering device are in failure;

FIG. 5C is a schematic view for explaining a communication state among the electronic control units of the steering system according to the embodiment in the case where the other of the two electronic control units of the reaction force applying device and the other of the two electronic control units of the steering device are in failure;

FIG. 5D is a schematic view for explaining a communication state among the electronic control units of the steering system according to the embodiment in the case where the electronic control unit of the operation information obtaining device and the electronic control unit of the auxiliary steering device are in failure;

FIG. 5E is a schematic view for explaining a communication state among the electronic control units of the steering system according to the embodiment in the case where both the two electronic control units of the reaction force applying device are in failure:

FIG. 5F is a schematic view for explaining a communication state among the electronic control units of the steering system according to the embodiment in the case where both the two electronic control units of the steering device are in failure;

FIG. 5G is a schematic view for explaining a communication state among the electronic control units of the steering system according to the embodiment in the case where the one of the two electronic control units of the reaction force applying device and the other of the two electronic control units of the steering device are in failure;

FIG. 5H is a schematic view for explaining a communication state among the electronic control units of the steering system according to the embodiment in the case where the other of the two electronic control units of the reaction force applying device and the one of the two electronic control units of the steering device are in failure;

FIG. 6I is a schematic view for explaining a communication state among the electronic control units of the steering system according to the embodiment in the case where the one of the two electronic control units of the reaction force applying device and the electronic control unit of the operation information obtaining device are in failure;

FIG. 6J is a schematic view for explaining a communication state among the electronic control units of the steering system according to the embodiment in the case where the other of the two electronic control units of the reaction force applying device and the electronic control unit of the operation information obtaining device are in failure;

FIG. 6K is a schematic view for explaining a communication state among the electronic control units of the steering system according to the embodiment in the case where the electronic control unit of the operation information obtaining device and the one of the two electronic control units of the steering device are in failure;

FIG. 6L is a schematic view for explaining a communication state among the electronic control units of the steering system according to the embodiment in the case where the electronic control unit of the operation information obtaining device and the other of the two electronic control units of the steering device are in failure;

FIG. 6M is a schematic view for explaining a communication state among the electronic control units of the steering system according to the embodiment in the case where the one of the two electronic control units of the reaction force applying device and the electronic control unit of the auxiliary steering device are in failure;

FIG. 6N is a schematic view for explaining a communication state among the electronic control units of the steering system according to the embodiment in the case where the other of the two electronic control units of the reaction force applying device and the electronic control unit of the auxiliary steering device are in failure;

FIG. 6O is a schematic view for explaining a communication state among the electronic control units of the steering system according to the embodiment in the case where the one of the two electronic control units of the steering device and the electronic control unit of the auxiliary steering device are in failure;

FIG. 6P is a schematic view for explaining a communication state among the electronic control units of the steering system according to the embodiment in the case where the other of the two electronic control units of the steering device and the electronic control unit of the auxiliary steering device are in failure.

DETAILED DESCRIPTION

Figure 1:
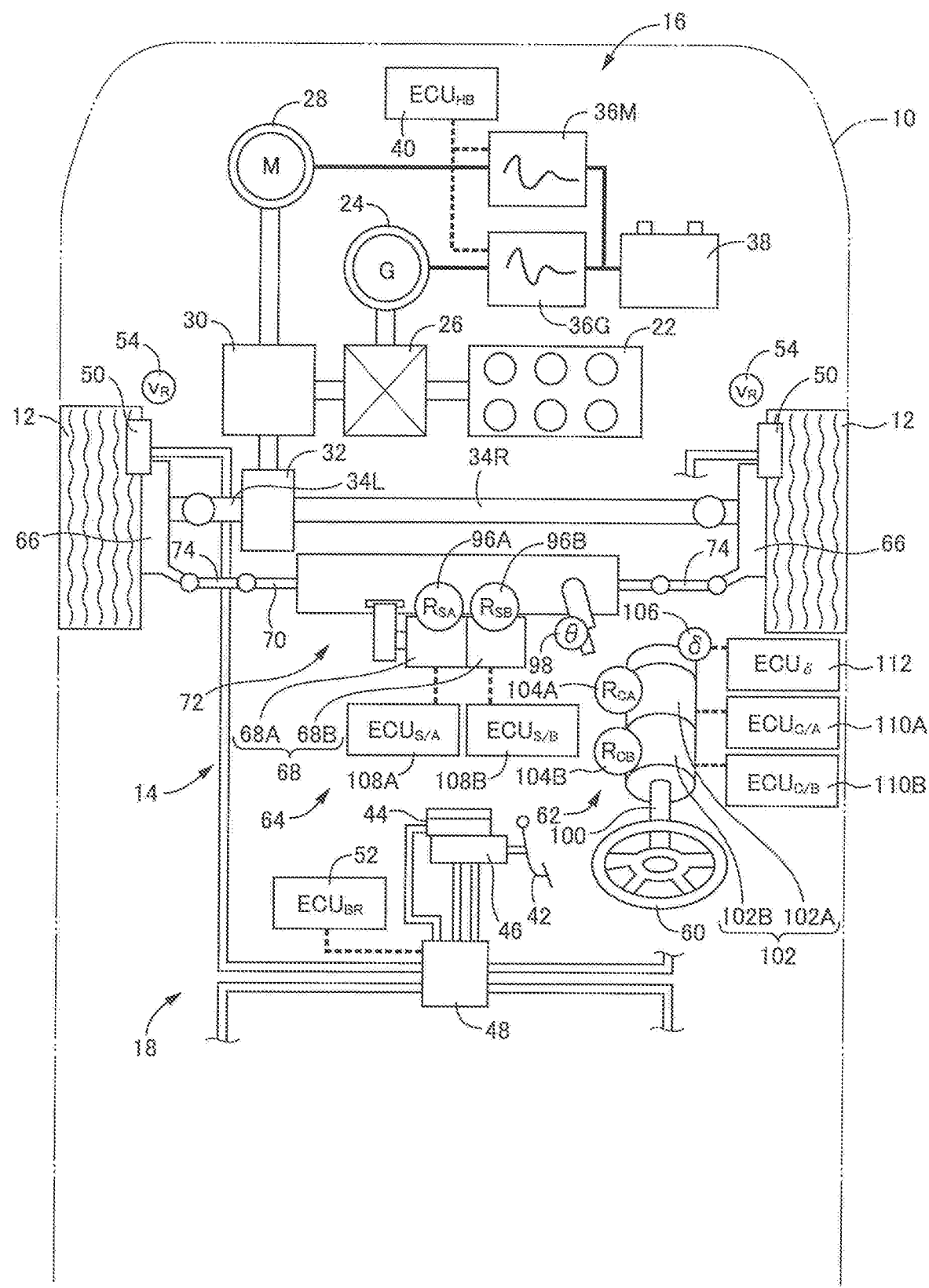
FIG. 1 is a view schematically illustrating a steering system according to one embodiment and an overall structure of a vehicle on which the steering system is installed.

Referring to the drawings, there will be explained below in detail a steering system according to one embodiment of the present disclosure. It is to be understood that the present disclosure is not limited to the details of the following embodiment but may be embodied based on the forms described in VARIOUS FORMS and may be changed and modified based on the knowledge of those skilled in the art.

A. Overall Structure of Vehicle on Which Steering System of Embodiment is Installed A steer-by-wire steering system according to the present embodiment is installed on a vehicle 10 illustrated in FIG. 1, for instance. The vehicle 10 has four wheels, i.e., front right and left wheels and rear right and left wheels. The front right and left wheels 12 illustrated in FIG. 1 are steerable wheels, and a vehicle steering system 14 steers the two front wheels 12. In the following explanation, a term "wheels 12" will be used where appropriate without making a distinction between the front wheels and the rear wheels. The vehicle 10 is a front-wheel drive vehicle, and the two front wheels 12 are drive wheels. A hybrid vehicle drive system 16 is installed on the vehicle 10 to drivingly rotate the two front wheels 12. Further, a hydraulic brake system 18 is installed on the vehicle 10 to stop rotation of the four wheels 12. The vehicle steering system 14 will be later explained in detail. Here, the vehicle drive system 16 and the brake system 18 will be briefly explained.

The vehicle drive system 16 is a known ordinary one. The vehicle drive system 16 includes an engine 22 as a drive source, a generator 24 that functions mainly as an electric generator, a power distribution mechanism 26 to which the engine 22 and the generator 24 are coupled, and an electric motor 28 as another drive source. The power distribution mechanism 26 has a function of distributing rotation of the engine 22 to rotation of the generator 24 and rotation of the output shaft. The electric motor 28 is coupled to the output shaft via a reduction mechanism 30 functioning as a speed reducer. The rotation of the output shaft is transmitted to the front right and left wheels 12 via a differential mechanism 32 and respective drive shafts 34L, 24R, so that the front right and left wheels 12 are drivingly rotated. The generator 24 is coupled to the battery 38 via an inverter 36G. Electric energy obtained by electric power generation by the generator 24 is stored in the battery 38. The electric motor 28 is coupled to the battery 38 via an inverter 36M. The electric motor 28 and the generator 24 are controlled by controlling the inverter 36M and the inverter 36G, respectively. Management of a charged amount of the battery 38 and control of the inverter 36M and the inverter 36G are executed by a hybrid electronic control unit 40 as a controller that includes a computer and drive circuits (drivers) for devices of the vehicle drive system. The hybrid electronic control unit 40 will be hereinafter referred to as "hybrid ECU 40" where appropriate.

When the vehicle decelerates, the electric motor 28 rotates by rotation of the front wheels 12 without receiving a power supply from the battery 38. The electric motor 28 generates electric power utilizing an electromotive force generated by its rotation, and the generated electric power is stored, via the inverter 36M, in the battery 38 as a quantity of electricity (which may be also referred to as an electric quantity or an electric charge). The rotation of the front wheels 12 is decelerated, that is, the vehicle is decelerated, by a degree corresponding to energy that corresponds to the charged electric quantity. In the present vehicle, the vehicle drive system 16 functions also as a regenerative brake system. The hybrid ECU 40 estimates a rotational speed of the wheels 12, namely, a running speed v of the vehicle 10, based on respective rotational speeds of the engine 22, the generator 24, and the electric motor 28. The hybrid ECU 40 is configured to transmit the estimated running speed v (hereinafter referred to as "vehicle speed $v_{HB}$" where appropriate) as vehicle speed information.

The brake system 18 is a known ordinary one. The brake system 18 includes a brake pedal 42 as a brake operation member, a tandem master cylinder 46 coupled to the brake pedal 42 and configured to pressurize a working fluid supplied from a reservoir 44, a brake actuator 48 coupled to the master cylinder 46, and disc brake devices 50 provided for the respective four wheels 12. Each disc brake device 50 is a wheel brake to which the working fluid is supplied from the brake actuator 48.

The brake actuator 48 incorporates a pump, electromagnetic valves, and so on. Under normal conditions, the brake actuator 48 shuts off a flow of the working fluid from the master cylinder 46 and adjusts a pressure of the working fluid that is pressurized by the pump to a pressure in accordance with an operation degree of the brake pedal 42, so as to supply the pressure-adjusted working fluid to each disc brake device 50. The brake actuator 48 is controlled by a brake electronic control unit 52 that includes drive circuits (drivers) for the pump and the electromagnetic valves, a computer, and so on. The brake electronic control unit 52 will be hereinafter referred to as "brake ECU 52" where appropriate.

The brake system 18 is capable of individually controlling braking forces generated by the four wheels 12. That is, the brake system 18 has a function of applying mutually different braking forces to the right wheels 12 and the left wheels 12. The present brake system 18 is capable of permitting the vehicle to turn rightward and leftward utilizing the function. Thus, the brake system 18 is capable of functioning as an auxiliary steering device that will be explained in detail. Each wheel 12 is provided with a wheel speed sensor 54. (Illustration of the wheel speed sensors 54 for the rear wheels is omitted.) The brake ECU 52 estimates the running speed v of the vehicle 10 based on wheel rotational speeds $v_R$ detected by the respective wheel speed sensors 54 and is capable of transmitting the estimated running speed v (hereinafter referred to as "vehicle speed $v_{BR}$" where appropriate) as vehicle speed information.

[B] Overall Structure of Steering System of the Embodiment

The vehicle steering system 14 according to the embodiment is what is called steer-by-wire steering system and includes a steering wheel 60 as a steering operation member, a reaction force applying device 62 configured to apply an operation reaction force to the steering wheel 60, and a steering device 64 configured to steer the wheels 12.

Each wheel 12 is rotatable held by a corresponding steering knuckle 66 that is pivotably supported by a body of the vehicle via a corresponding suspension apparatus. The steering device 64 includes: a steering actuator 72 including a steering motor 68 (that is an electric motor as a drive source) and configured to move a steering rod 70 in the right-left direction; and link rods 74, one end of each of which is coupled to a corresponding one of opposite ends of the steering rod 70 via a ball joint. The other end of each link rod 74 is coupled, via a ball joint, to a knuckle arm of the corresponding steering knuckle 66. The steering knuckles 66 are pivoted by the movement of the steering rod 70 in the right-left direction, whereby the wheels 12 are steered.

Figure 2:
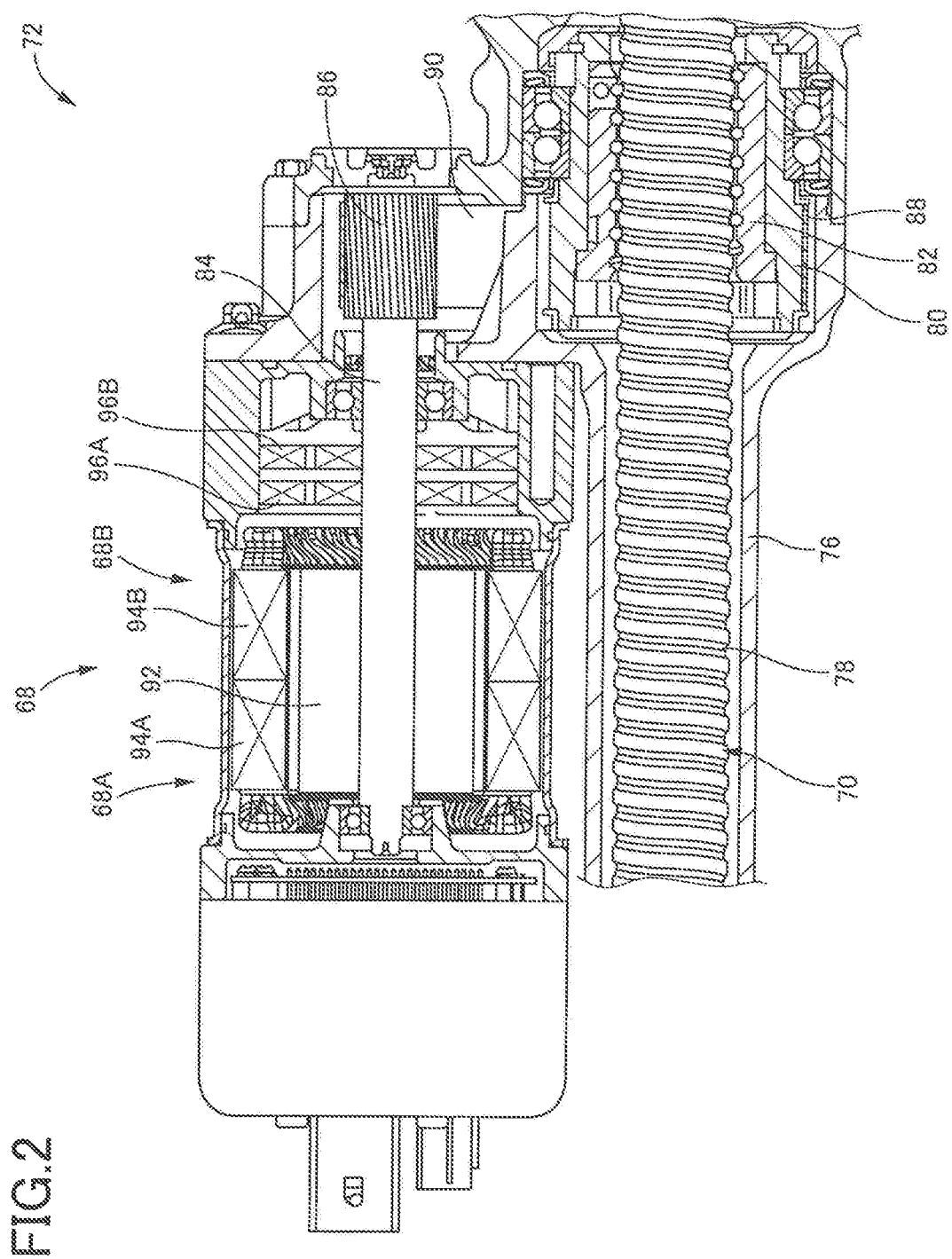
FIG. 2 is a cross-sectional view of a steering actuator of a steering device of the steering system according to the embodiment.

Referring also to FIG. 2, the steering actuator 72 will be explained. As shown in FIG. 2, the steering actuator 72 holds, in its housing 76, the steering rod 70 such that the steering rod 70 is unrotatable about an axis thereof and movable in the right-left direction. A screw groove 78 is formed on an outer circumference of the steering rod 70. A holding sleeve 80 is held in the housing 76 so as to be rotatable about an axis thereof and immovable in the right-left direction. A nut 82 holding bearing balls is fixedly held by the holding sleeve 80. The nut 82 and the steering rod 70 are threadedly engaged with each other and constitute a ball screw mechanism. The steering motor 68 is disposed outside the housing 76 such that its axis is parallel to an axis of the steering rod 70. A timing pulley 86 is attached to a distal end of the motor shaft 84. Like the timing pulley 86, the holding sleeve 80 includes engaging teeth 88 formed on its outer circumference. Thus, the holding sleeve 80 functions as another timing pulley that is paired with the timing pulley 86. A timing belt 90 is wound around the holding sleeve 80 and the timing pulley 86. Rotation of the steering motor 68, strictly, rotation of the motor shaft 84, causes the nut 82 to be rotated, so that the steering rod 70 is moved rightward or leftward in accordance with the rotational direction of the steering motor 68.

The steering motor 68 is a three-phase brushless DC motor, for instance, and includes two systems. Specifically, magnets 92 common to the two systems are fixed to an outer circumference of the motor shaft 84 so as to be arranged in the circumferential direction, and two sets of coils corresponding to the respective two systems, i.e., a set of coils 94A and a set of coils 94B, are provided so as to be opposed to the magnets 92. The steering motor 68 is rotated by supplying electric current to one or both of the two sets of coils 94A, 94B. A torque generated by the steering motor 68, namely, a force that moves the steering rod 70 in the right-left direction, is generally proportional to a sum of electric currents supplied to the coils 94A, 94B. The steering motor 68 is the two-system motor, and the steering actuator 72 may be assumed to have two steering motors. in this case, portions of the steering motor 68 corresponding to the respective two systems will be hereinafter referred to as a steering motor 68A and a steering motor 68B for convenience sake. Accordingly, the steering motors 68A, 68B may be regarded as two drive sources of the steering device 64, and the steering device 64 itself includes two systems.

The steering motors 68A, 68B of the steering actuator 72 respectively include motor rotation angle sensors 96A, 96B (each of which is a resolver) according to the two systems of the steering motor 68. Each motor rotation angle sensor 96A, 96B is configured to detect a relative phase between the magnets 92 attached to the motor shaft 84 and the coils 94A or the coils 94B, namely, a motor rotation angle $R_S$ that is a rotation angle of the motor shaft 84. Like a steering actuator of a power steering device, the steering actuator 72 is provided with a rack-and-pinion mechanism, as schematically illustrated in FIG. 1. The steering actuator 72 is further provided with a steering amount sensor 98 configured to detect a rotation angle of a pinion shaft of the rack-and-pinion mechanism as a motion amount of the steering rod 70, namely, as a steering amount θ of the wheels 12. In this respect, the steering amount sensor 98 is capable of detecting the rotation angle of the pinion shaft beyond 360° from a state in which the steering rod 70 is positioned at a neutral position (at which the wheels 12 are steered neither rightward nor leftward). Thus, the steering amount sensor 98 functions as an absolute angle sensor. As the steering amount sensor 98, a sensor similar to what is called steering sensor (which will be explained) may be used.

As shown in FIG. 1, the reaction force applying device 62 includes: a steering shaft 100 fixed to the steering wheel 60 and rotatable with the steering wheel 60; and a reaction force motor 102 that is an electric motor. A motor shaft of the reaction force motor 102 is integral with the steering shaft 100, and the reaction force motor 102 applies a rotational torque to the steering wheel 60. The rotational torque functions as a reaction force (operation reaction force) with respect to an operation of the steering wheel 60 by the driver, i.e., a steering operation. Thus, the reaction force motor 102 functions as a reaction force actuator.

Though a detailed structure of the reaction force motor 102 is not illustrated, the reaction force motor 102 is a two system brushless DC motor, like the steering motor 68. Accordingly, the reaction force applying device 62 may be assumed to have two reaction force motors. In this case, as shown in FIG. 1, portions of the reaction force motor 102 corresponding to the respective two systems will be hereinafter referred to as a reaction force motor 102A and a reaction force motor 102B for convenience sake. The operation reaction force functions as a force to return the steering wheel 60 to a neutral position (at which the steering wheel 60 is operated neither rightward nor leftward). The operation reaction force is generated by supplying electric current to one or both of the reaction force motors 102A, 102B. The operation reaction force has a magnitude generally proportional to a sum of electric currents supplied to the reaction force motors 102A, 102B. Like the steering device 64, the reaction force applying device 62 includes two systems corresponding to the two systems of the reaction force motor 102.

The reaction force motors 102A, 102B of the reaction force applying device 62 are respectively provided with motor rotation angle sensors 104A, 104B (each of which is a resolver) according to the two systems of the reaction force motor 102. As each of the motor rotation angle sensors 104A, 104B, GMR may be used. Each motor rotation angle sensor 104A, 104B is configured to detect a motor rotation angle $R_C$ of the motor shaft of the reaction force motor 102 that is integral with the steering shaft 100. The reaction force applying device 62 is provided with an operation amount sensor 106 configured to detect an operation amount δ of the steering wheel 60. The operation amount sensor 106 is also referred to as a steering sensor and is capable of detecting, as the operation amount δ, a rotational amount of the steering wheel 60 beyond 360° from a state in which the steering wheel 60 is positioned at the neutral position (at which the steering wheel 60 is operated neither rightward nor leftward). Thus, the operation amount sensor 106 functions as an absolute angle sensor. In this respect, it may be considered that the operation amount sensor 106 directly detects the degree of the operation of the steering wheel.

C. Control Configuration of Steering System of Embodiment

Referring to FIG. 1, a control configuration of the present steering system will be explained. Control of the steering device 64, namely, control of the steering motor 68 of the steering actuator 72, is executed by two steering electronic control units 108A, 108B (hereinafter referred to as "steering ECUs 108A, 108B" where appropriate) corresponding to the two systems. Each steering ECU 108A, 108B functions as a steering controller. Specifically, the steering ECU 108A controls the operation of the steering motor 68A based on the motor rotation angle $R_S$ detected by the motor rotation angle sensor 96A while the steering ECU 108B controls the operation of the steering motor 68B based on the motor rotation angle $R_S$ detected by the motor rotation angle sensor 96B. Similarly, control of the reaction force applying device 62, namely, control of the reaction force motor 102, is executed by two reaction force electronic control units 110A, 110B (hereinafter referred to as "reaction force ECUs 110A, 110B" where appropriate) corresponding to the two systems. Each reaction force ECU 110A, 110B functions as a reaction force controller. Specifically, the reaction force ECU 110A controls the operation of the reaction force motor 102A based on the motor rotation angle $R_C$ detected by the motor rotation angle sensor 104A while the reaction force ECU 110B controls the operation of the reaction force motor 102B based on the motor rotation angle $R_C$ detected by the motor rotation angle sensor 104B. The vehicle steering system 14 includes an operation amount electronic control unit 112 (hereinafter referred to as "operation amount ECU 112" where appropriate) for transmission of information on the operation amount δ detected by the operation amount sensor 106.

Figure 3:
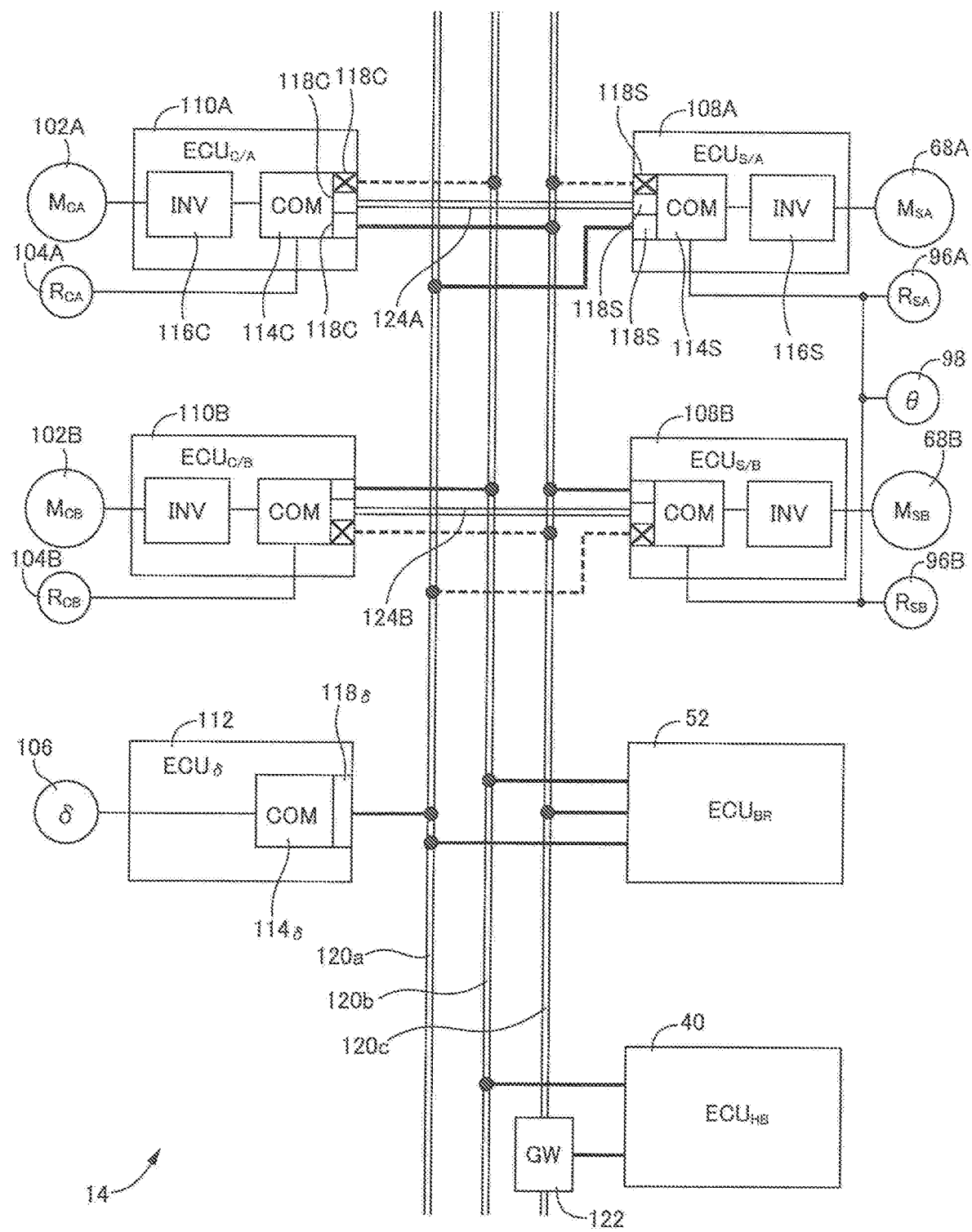
FIG. 3 is a block diagram illustrating a configuration relating to a control of the steering system according to the embodiment.

The control configuration of the vehicle steering system 14 will be further explained referring to a block diagram of FIG. 3. Each of the steering ECUs 108A, 108B is constituted by a computer 114S including a CPU, a ROM, a RAM, etc., and an inverter 116S as a drive circuit (driver) for a corresponding one of the steering motor 68A and the steering motor 68B. The computer 114S controls, via the inverter 116S, the operation of the corresponding steering motor 68A, 68B. To the computers 114S of the respective steering ECUs 108A, 108B, the motor rotation angle sensors 96A, 96B are respectively connected. Each steering ECU 108A, 108B has three ports for communication, and each computer 114S has three input/output interfaces 118S, each functioning as a transceiver, so as to correspond to the three ports. Each input/output interface 118S will be hereinafter referred to as "I/O 118S" where appropriate. The computers 114S of the steering ECUs 108A, 108B are connected also to the steering amount sensor 98.

Similarly, each of the reaction force ECUs 110A, 110B is constituted by a computer 114C including a CPU, a ROM, a RAM, etc., and an inverter 116C as a drive circuit (driver) for a corresponding one of the reaction force motor 102A and the reaction force motor 102B. The computer 114C controls, via the inverter 116C, the operation of the corresponding reaction force motor 102A, 102B. To the computers 114C of the respective reaction force ECUs 110A, 110B, motor rotation angle sensors 104A, 104B are respectively connected. Each reaction force ECU 110A, 110B has three ports for communication, and each computer 114C has three input/output interfaces 118C, each functioning as a transceiver, so as to correspond to the three ports. Each input/output interface 118C will be hereinafter referred to as "I/O 118C" where appropriate.

The operation amount ECU 112 includes a computer 114 δ constituted by a CPU, a ROM, a RAM, etc., and the computer 114 δ is connected to the operation amount sensor 106. The operation amount ECU 112 has one port for communication, and the computer 114 δ has one input/output interface 118 δ functioning as a transceiver, so as to correspond to the one port. The input/output interface 118 δ will be hereinafter referred to as "I/O 118 δ" where appropriate. It is noted that the operation amount ECU 112 and the operation amount sensor 106 function as an operation information obtaining device configured to obtain, as operation information, the operation amount δ of the steering wheel 60, independently of the reaction force applying device 62.

Each of the steering ECUs 108A, 108B, the reaction force ECUs 110A, 110B, and the operation amount ECU 112 is connected to at least one of three communication buses 120 so as to perform communication with one another. When it is necessary to distinguish the three communication buses 120 from each other, the three communication buses 120 are individually referred to as a first communication bus 120a, a second communication bus 120b, and a third communication bus 120c. Specifically, the steering ECUs 108A, 108B are connected to the first communication bus 120a and the third communication bus 120c, the reaction force ECUs 110A, 110B are connected to the second communication bus 120b and the third communication bus 120c, and the operation amount ECU 112 is connected to the first communication bus 120a. The brake ECU 52 is connected to the first communication bus 120a, the second communication bus 120b, and the third communication bus 120c. The hybrid ECU 40 is connected to the second communication bus 120b. Further, the hybrid ECU 40 is connected to the third communication bus 120c via a gateway 122.

The present vehicle steering system 14 may be considered as a two-system steering system constituted by: one system including the steering motor 68A, the steering ECU 108A, the reaction force motor 102A, and the reaction force ECU 110A (hereinafter referred to as "A system" where appropriate); and one system including the steering motor 68B, the steering ECU 108B, the reaction force motor 102B, and the reaction force ECU 110B (hereinafter referred to as "B system" where appropriate). For permitting the present vehicle steering system 14 to function as the two-system steering system, the steering ECU 108A and the reaction force ECU 110A are connected by a first dedicated communication line 124A (hereinafter abbreviated as "dedicated communication line 124A" where appropriate) while the steering ECU 108B and the reaction force ECU 110B are connected by a second dedicated communication line 124B (hereinafter abbreviated as "dedicated communication line 124B" where appropriate).

D. Control in Steering System of Embodiment under Normal Conditions

Control of the present vehicle steering system 14 under normal conditions, namely, control of the present vehicle steering system 14 when none of the two systems (the A system and the B system) in the vehicle steering system 14 are in failure, is classified mainly into: a reaction force control of controlling the reaction force applying device 62, i.e., the reaction force motors 102A, 102B, by the reaction force ECUs 110A, 110B; and a steering control of controlling the steering device 64, i.e., the steering motors 68A, 68B, by the steering ECUs 108A, 108B. As explained above, the vehicle steering system 14 includes the two systems in which the same control is executed. Accordingly, the following explanation will be made focusing on one of the two systems. In view of this, suffixes "A", "B" used with the reference numbers for the constituent components (such as the reaction force ECUs 110A, 110B, the reaction force motors 102A, 102B, the steering ECUs 108A, 108B, the steering motors 68A, 68B, etc.,) are deleted. Those components will be simply represented as the reaction force ECU 110, the reaction force motor 102, the steering ECU 108, the steering motor 68, etc. That is, the two systems are treated as one system. Under normal conditions, the reaction force ECU 110A and the steering ECU 108A communicate with each other via the dedicated communication line 124A while the reaction force ECU 110B and the steering ECU 108B communicate with each other via the dedicated communication line 124B, in accordance with the two systems. Thus, under normal conditions, communication between the reaction force ECU 110 and the steering ECU 108 via the first-third communication buses 120a-120c is not performed.

i) Reaction Force Control

The reaction force control executed under normal conditions by the reaction force ECU 110, specifically, by the computer 114C of the reaction force ECU 110, is basically executed such that an operation reaction force $F_C$ having a magnitude in accordance with the operation amount δ is applied to the steering wheel 60. Such control is a basic reaction force control. In other words, a supply current $I_C$ to the reaction force motor 102 is controlled such that the force to return the steering wheel 60 to the neutral position increases with an increase in the operation amount δ. The operation amount δ is calculated by cumulating the motor rotation angle $R_C$ detected by the motor rotation angle sensor 104 provided for the reaction force motor 102. Thus, the reaction force ECU 110 grasps the operation amount δ at the present point in time by the calculation based on the motor rotation angle $R_C$ and determines, based on the operation amount δ, the operation reaction force $F_C$ to be applied according to the following expression:

$$F_C = \alpha_c \times \delta$$

wherein $\alpha_c$ represents a basic reaction force gain.

It is noted that the operation amount δ grasped by the reaction force ECU 110 at a time point when the vehicle 10 starts operating is calibrated based on the operation amount δ detected by the operation amount sensor 106.

In the reaction force control executed in the present vehicle steering system 14, the reaction force ECU 110 executes, in addition to the basic reaction force control described above, i) a vehicle-speed-dependent reaction force control based on the running speed v of the vehicle 10 and ii) a steering-load-dependent reaction force control based on a load on the steering device 64, namely, a load on the steering actuator 72. In the vehicle-speed-dependent reaction force control, the operation reaction force is increased for causing the steering wheel 60 not to be operated easily with an increase in the vehicle speed v. In the steering-load-dependent reaction force control, in the case where the load on the steering actuator 72 becomes large when the wheels 12 mount on a curb or the like, the operation reaction force is increased for permitting the driver to notice the increased load. As explained above, the hybrid ECU 40 and the brake ECU 52 estimate the vehicle speed v as the vehicle speed $v_{HB}$ and the vehicle speed $v_{BR}$, respectively. The reaction force ECU 110 executes the vehicle-speed-dependent reaction force control based on the vehicle speed information about the vehicle speeds $v_{HB}$, $v_{BR}$ transmitted from the hybrid ECU 40 and the brake ECU 52 via the first-third communication buses 120a-120c. As later explained, the steering ECU 108 determines a target steering amount θ* as a target of the steering amount θ of the wheels 12 and executes a feedback control based on a steering amount deviation Δθ (=θ*−θ) such that an actual steering amount θ becomes equal to the target steering amount θ*. It is estimated that the load on the steering actuator 72, namely, the load on the steering motor 68, is larger when the steering amount deviation Δθ is larger. Based on the steering amount deviation Δθ transmitted as the steering information from the steering ECU 108, the reaction force ECU 110 executes the steering-load-dependent reaction force control such that the operation reaction force $F_C$ is increased with an increase in the steering amount deviation Δθ.

In addition to the basic reaction force control described above, the reaction force ECU 110 executes the vehicle-speed-dependent reaction force control and the steering-load-dependent reaction force control, so as to determine the operation reaction force $F_C$ to be applied in the reaction force control according to the following expression:

$$F_C = \alpha_c \times \delta + \beta_C \times v + \gamma_C \times \Delta\theta$$

wherein $\beta_C$ represents a vehicle-speed-dependent reaction force gain and $\gamma_C$ represents a steering-load-dependent reaction force gain.

The electric current $I_C$ for applying the operation reaction force $F_C$ determined according to the above expression is supplied from the inverter 116C to the reaction force motor 102.

ii) Steering Control

The steering control executed under normal conditions by the steering ECU 108, specifically, by the computer 114S of the steering ECU 108, is executed basically such that the steering actuator 72, i.e., the steering motor 68, is controlled such that the steering amount θ of the wheels 12 becomes equal to an amount in accordance with the operation amount δ of the steering wheel 60. Such control is a basic steering control. The steering amount θ is calculated by cumulating the motor rotation angle $R_S$ detected by the motor rotation angle sensor 96 provided for the steering motor 68. Thus, the steering ECU 108 grasps the steering amount θ at the present point in time by the calculation based on the motor rotation angle $R_S$. Further, the steering ECU 108 determines, according to the following expression, the target steering amount θ* as the target of the steering amount θ based on the operation amount δ of the steering wheel 60 transmitted as the operation information from the reaction force ECU 110:

$$\theta^* = \alpha_S \times \delta$$

wherein $\alpha_S$ represents a basic steering gain.

The steering ECU 108 obtains the steering amount deviation Δθ that is a deviation of an actual steering amount θ from the target steering amount and executes a feedback control of the steering motor 68 based on the steering amount deviation Δθ. Specifically, the supply current $I_S$ to the steering motor 68 is determined according to the following expression, and the determined current is supplied from the inverter 116S to the steering motor 68:

$$I_S = \beta_{SP} \times \Delta\theta + \beta_{SD} \times d\Delta\theta$$

wherein $\beta_{SP}$ represents a proportional gain, $\beta_{SD}$ represents a derivative gain, and $d\Delta\theta$ represents a derivative value of steering amount deviation.

Like the operation amount δ, the steering amount θ grasped by the steering ECU 108 at a time point when the vehicle 10 starts operating is calibrated based on the steering amount θ detected by the steering amount sensor 98.

In the steering control executed in the present vehicle steering system 14, the steering ECU 108 executes, in addition to the basic steering control, a steering ratio change control based on the running speed v of the vehicle 10. The present vehicle steering system 14 has what is called variable gear ratio system (VGRS) function. In the steering ratio change control, a ratio of change in the steering amount θ with respect to a change in the operation amount δ, namely, a steering ratio, is made smaller with an increase in the vehicle speed v, in view of the vehicle running stability. Conversely, the steering ratio is made larger with a decrease in the vehicle speed v for enhancing the operability or the maneuverability of the vehicle. Like the reaction force ECU 110, the steering ECU 108 executes the steering ratio change control based on the vehicle speed information about the vehicle speeds $v_{HB}$, $v_{BR}$ transmitted from the hybrid ECU 40 and the brake ECU 52 via the first-third communication buses 120a-120c. The steering ECU 108 executes the steering ratio change control in addition to the basic steering control described above, so as to determine the target steering amount θ* according to the following expression:

$$\theta^* = \gamma_S(v) \times \alpha_S \times \delta$$

wherein $\gamma_S(v)$ represents a coefficient based on vehicle running speed v as a parameter.

E. Measures for Coping with Electrical Failure in Steering System of Embodiment

The vehicle steering system 14 is what is called the steer-by-wire steering system in which the wheels 12 are steered by electric control of the steering actuator 72 without depending on the operation force applied to the steering wheel 60 by the driver. The present vehicle steering system 14 is not equipped with means for steering the wheels 12 by the operation force of the driver in the case where an electrical failure occurs in the vehicle steering system 14. From the viewpoint of failsafe, therefore, it is significantly important to cope with the electrical failure, specifically, a failure of the reaction force ECU 110 and the steering ECU 108 of the vehicle steering system 14. There will be hereinafter explained measures provided for the vehicle steering system 14 to cope with the failure of the reaction force ECU 110 and the steering ECU 108.

i) Three Redundant Systems

In the case where the electrical failure occurs in any of the reaction force ECUs 110 and the steering ECUs 108 of the vehicle steering system 14, the vehicle steering system 14 needs to exert at least a function of changing a direction of the vehicle 10 to some extent in accordance with the operation amount δ of the steering wheel 60. As explained above, the vehicle steering system 14 includes, each as a system for obtaining the operation amount δ as the operation information, two systems which correspond to the two-system reaction force applying device 62 and each of which includes one reaction force ECU 110 and one motor rotation angle sensor 104. The system for obtaining the operation amount δ as the operation information will be hereinafter referred to as "operation information obtaining system" where appropriate. Further, the vehicle steering system 14 includes, as a system for changing the direction of the vehicle 10, two systems for changing the direction of the vehicle 10 by steering the wheels 12 each of which includes one steering ECU 108 and one steering motor 68. The system for changing the direction of the vehicle 10 will be hereinafter referred to as "wheel-steering system" where appropriate. One of the two reaction force ECUs 110 and one of the two steering ECUs 108 are connected by one dedicated communication line 124 while the other of the two reaction force ECUs 110 and the other of the two steering ECUs 108 are connected by another dedicated communication line 124. In this configuration, even when any one of the two reaction force ECUs 110 and the two steering ECUs 108 suffers from a failure, namely, even in the event of a primary failure, the operation of at least one operation information obtaining system and the operation of at least one wheel-steeling system are ensured, that is, the operation of one of the two systems of the present vehicle steering system 14 is ensured.

Though it is very unlikely that any two of the reaction force ECUs 110 and the steering ECUs 108 fail to operate at the same time, a case is considered here in which such a secondary failure occurs. From the viewpoint of failsafe, it is desirable to cope with the secondary failure.

Accordingly, where each of the two operation information obtaining systems described above is defined as a main operation information obtaining system, the vehicle steering system 14 includes, in addition to the main operation information obtaining systems, an auxiliary operation information obtaining system that is an alternative operation information obtaining system, namely, the operation information obtaining device that includes the operation amount sensor 106 and the operation amount ECU 112.

Further, where each of the two wheel-steering systems is defined as a main wheel-steering system, the brake system 18, which has the function of changing the direction of the vehicle 10 by applying the braking forces to the right and left wheels 12 independently of each other, functions as an auxiliary wheel-steering system that is an emergency steering system. In steering of the wheels 12 by the brake system 18, the wheels 12 are not actually steered, but the vehicle behaves as if the wheels 12 are steered. In this sense, the brake system 18 is referred to as the "auxiliary wheel-steering system" for convenience sake. That is, the brake system 18 is constructed as a part of the vehicle steering system 14. In other words, the brake system 18 controlled by the brake ECU 52 functions as the auxiliary steering device in the vehicle steering system 14. The brake system 18 as the auxiliary wheel-steering system operates only when the two main wheel-steering systems fail to operate. Specifically, the brake ECU 52 controls the brake actuator 48 based on the information about the obtained operation amount δ of the steering wheel 60 such that a difference between the braking forces to be applied to the right and left wheels 12 corresponds to the operation amount δ. The vehicle can veer to the right by increasing the braking force to the right-side wheels 12 so as to be larger than the braking force to the left-side wheels 12. The vehicle can veer to the left by increasing the braking force to the left-side wheels 12 so as to be larger than the braking force to the right-side wheels 12.

In the present vehicle steering system 14, the operation amount ECU 112 that constitutes the operation information obtaining device can transmit, as the operation information, information on the operation amount δ obtained by itself. The operation amount ECU 112, the steering ECUs 108, and the brake ECU 52 are connected to the first communication bus 120a such that the information transmitted by the operation amount ECU 112 can be received, via the first communication bus 120a, by each of the two steering ECUs 108 and the brake ECU 52 as the auxiliary steering device.

According to the configuration described above, the vehicle steering system 14 is constituted by the three operation information obtaining systems and the three wheel-steering systems. Even in the event of the secondary failure in which two of the reaction force ECUs 110 and the steering ECUs 108 fail to operate, any of the wheel steering systems can change the direction of the vehicle based on the operation amount δ of the steering wheel 60 obtained by any of the three operation information obtaining systems. That is, the operation information obtaining systems and the wheel-steering systems in the vehicle steering system 14 are both three redundant systems.

As explained above, the reaction force control executed by each reaction force ECU 110 under normal conditions includes, in addition to the basic reaction force control, the steering-load-dependent reaction force control and the vehicle-speed-dependent reaction force control. The steering control executed by each steering ECU 108 under normal conditions includes, in addition to the basic steering control, the steering ratio change control. In the vehicle steering system 14, even if one of the steering ECUs 108 is in failure, the steering-load-dependent reaction force control can be executed by each reaction force ECU 110 as much as possible. Further, even, if the hybrid ECU 40 or the brake ECU 52 each configured to transmit the vehicle speed information fails to operate or the communication path for transmitting the vehicle speed information fails to function, the vehicle-speed-dependent reaction force control can be executed by each reaction force ECU 110 as much as possible and the steering ratio change control can be executed by each steering ECU 108 as much as possible. In view of this, as shown in FIG. 3, the two reaction force ECUs 110, the two steering ECUs 108, the operation amount ECU 112, the brake ECU 52, and the hybrid ECU 40 are connected to one another by the first communication bus 120a, the second communication bus 120b, and the third communication bus 120c. The three communication buses 120a-120c will be collectively or individually referred to as "communication bus 120" where appropriate.

The functions of the respective three communication buses 120a-120c will be briefly explained. The first communication bus 120a is considered as a communication bus through which the operation amount δ of the steering wheel 60 obtained by the operation amount ECU 112 that constitutes the operation information obtaining device is transmitted to the steering ECUs 108 and the brake ECU 52 as the three wheel-steering systems. The second communication bus 120b is considered as a communication bus through which the information about the vehicle speed v from the hybrid ECU 40 and the brake ECU 52 is transmitted to the two reaction force ECUs 110. The third communication bus 120c is considered as a communication bus through which the information about the vehicle speed v from the hybrid ECU 40 and the brake ECU 52 is transmitted to the two steering ECUs 108. Further, the third communication bus 120c allows communication between: the reaction force ECU 110 of one of the A system and the B system; and the steering ECU 108 of the other of the A system and the B system and communication between: the reaction force ECU 110 of the other of the A system and the B system; and the steering ECU 108 of the one of the A system and the B system.

ii) Measures for Coping with Failure of Electronic Control Unit that Involves Disordered Transmission Phenomenon In the case where each of the steering ECUs 108, the reaction force ECUs 110, the operation amount ECU 112, the hybrid ECU 40, and the brake ECU 52 (hereinafter each simply referred to as "ECU" where appropriate) transmits information (hereinafter referred to as "content information" where appropriate) through the communication buses 120, each ECU attaches, to the information, identification information such as an address, an ID or the like for identifying the ECU, and sends, to the communication buses 120, the content information to which the identification information is attached. Each ECU receives the content information required by itself from among pieces of information that flow through the communication buses, based on the identification information. In the case where a certain ECU is in failure, that is, the computer 114S, 114C, 114 δ of the ECU is in failure, there is a possibility that the ECU suffering from the failure discharges massive amounts of meaningless information to the communication buses 120 without attaching the identification information. In other words, there is a possibility of occurrence of a failure that involves a disordered transmission phenomenon.

In the case where a certain ECU suffers from the failure that involves the disordered transmission phenomenon, the communication bus/buses 120 to which the ECU is connected becomes full of the massive amounts of discharged information, so that it is expected that the communication bus/buses 120 in question fail to function, totally disabling communication via the communication bus/buses 120.

Accordingly, each of the steering ECUs 108 and the reaction force ECUs 110 of the vehicle steering system 14 is configured such that each ECU receives the information via one of the three ports from the communication bus 120 that is connected to the one port but each ECU prohibits an outflow of the information via the one port to the communication bus 120. That is, the ECU performs, via the one port, one-way communication in which only reception of the information is allowed. In each of the steering ECUs 108 and the reaction force ECUs 110, the one-way communication is performed through one of the three I/Os 118S, 118C of the computer 114S, 114C. In FIG. 3, the one of the three I/Os 118S, 118C through which the one-way communication is performed is marked with "x", and a communication line through which the one-way communication between the communication bus 120 and the one port is performed is indicated by the dashed line.

Specifically, the reaction force ECU 110A receives the information from the second communication bus 120b but is not allowed to feed the information into the second communication bus 120b. The reaction force ECU 110B receives the information from the third communication bus 120c but is not allowed to feed the information into the third communication bus 120c. The steering ECU 108A receives the information from the third communication bus 120c but is not allowed to feed the information into the third communication bus 120c. The steering ECU 108B receives the information from the first communication bus 120a but is not allowed to feed the information into the first communication bus 120a. According to this configuration, even when the failure that involves the disordered transmission phenomenon occurs in the reaction force ECU 110A, communication via the second communication bus 120b is not hindered. Even when the failure occurs in the reaction force ECU 110B, communication via the third communication bus 120c is not hindered. Even when the failure occurs in the steering ECU 108A, communication via the third communication bus 120c is not hindered. Even when the failure occurs in the steering ECU 108B, communication via the first communication bus 120a is not hindered.

As explained above, all of the four ECUs, i.e., the two reaction force ECUs 110 and the two steering ECUs 108, include the three communication ports, and the one-way communication is configured to be performed via one of the three ports. In other words, the configuration as to the communication ports is common to the reaction force ECUs 110 and the steering ECUs 108, contributing to simplification of the structure of the vehicle steering system 14.

iii) Operations of Steering System in the Case of Occurrence of Electrical Failure There will be hereinafter explained how communication among non-failure ECUs is ensured and how the vehicle steering system 14 operates in the case where one or two of the ECUs suffer from the electrical failure. In the following explanation, the hybrid ECU 40 belonging to none of the three operation information obtaining systems and the three wheel-steering systems is not explained.

Figure 4A:
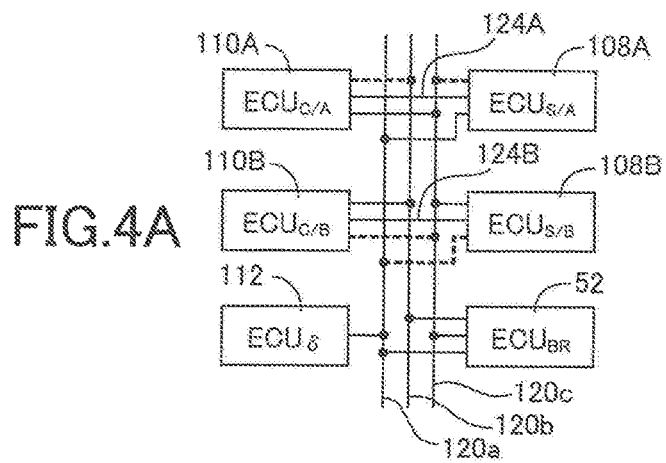
FIG. 4A is a schematic view for explaining a communication state among electronic control units of the steering system according to the embodiment in the case where none of the electronic control units are in failure.

Referring first to FIGS. 4B-4G, there will be explained cases in which one ECU suffers from the failure involving the disordered transmission phenomenon. In the cases illustrated in FIGS. 4B-4G, mutually different ECUs are in failure. In FIGS. 4A-4G, illustration of the internal structure of each ECU is omitted. For reference sake, FIG. 4A illustrates a state in which none of the ECUs are in failure. In FIGS. 4B-4G, one ECU that is in failure is marked with "x", and the communication bus/buses 120 and the dedicated communication line/lines 124 that are not functioning are erased, that is, not illustrated.

Figure 4B:
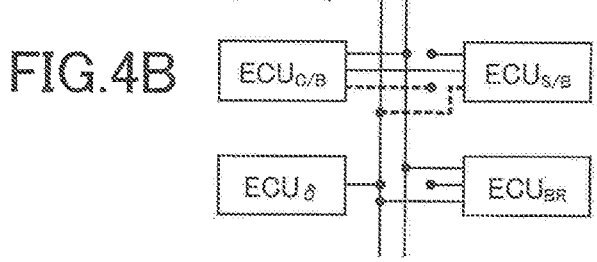
FIG. 4B is a schematic view for explaining a communication state among the electronic control units of the steering system according to the embodiment in the case where one of two reaction force electronic control units of a reaction force applying device is in failure.

FIG. 4B illustrates a state in which the reaction force ECU 110A is in failure. In this state, the dedicated communication line 124A and the third communication bus 120c are not functioning. The steering ECU 108A executes the basic steering control based on the operation information received from the operation amount ECU 112 via the first communication bus 120a. The steering ECU 108A and the steering ECU 108B execute the steering ratio change control based on the vehicle speed information received from the brake ECU 52 via the first communication bus 120a. The reaction force ECU 110B executes the vehicle-speed-dependent reaction force control based on the vehicle speed information received from the brake ECU 52 via the second communication bus 120b. In the vehicle steering system 14, the operation information is information as to the operation amount $\delta$, and the vehicle speed information is information as to the running speed v of the vehicle 10. This applies to the following explanation.

Figure 4E:
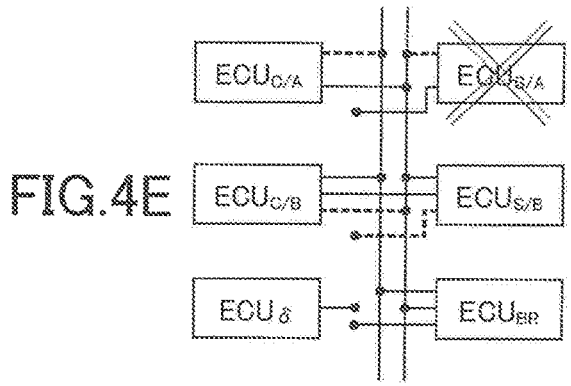
FIG. 4E is a schematic view for explaining a communication state among the electronic control units of the steering system according to the embodiment in the case where one of two electronic control units of a steering device is in failure.
Figure 4C:
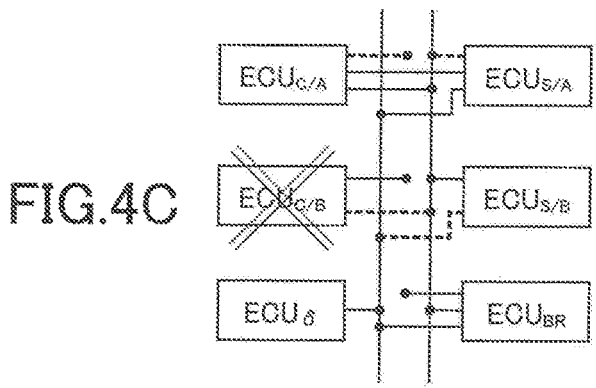
FIG. 4C is a schematic view for explaining a communication state among the electronic control units of the steering system according to the embodiment in the case where the other of the two electronic control units of the reaction force applying device is in failure.

FIG. 4C illustrates a state in which the reaction force ECU 110B is in failure. In this state, the dedicated communication line 124B and the second communication bus 120b are not functioning. The steering ECU 108B executes the basic steering control based on the operation information received from the operation amount ECU 112 via the first communication bus 120a. The steering ECU 108A and the steering ECU 108B execute the steering ratio change control based on the vehicle speed information received from the brake ECU 52 via the first communication bus 120a or the third communication bus 120c. The reaction force ECU 110A executes the vehicle-speed-dependent reaction force control based on the vehicle speed information received from the brake ECU 52 via the third communication bus 120c.

Figure 4F:
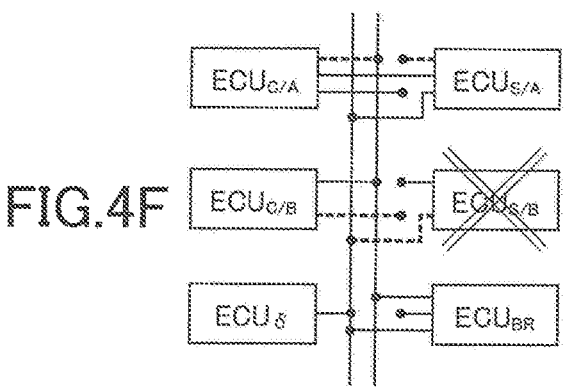
FIG. 4F is a schematic view for explaining a communication state among the electronic control units of the steering system according to the embodiment in the case where the other of the two electronic control units of the steering device is in failure.
Figure 4D:
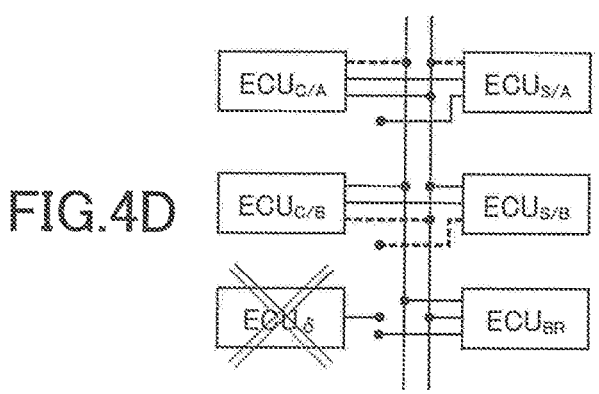
FIG. 4D is a schematic view for explaining a communication state among the electronic control units of the steering system according to the embodiment in the case where an electronic control unit of an operation information obtaining device is in failure.

FIG. 4D illustrates a state in which the operation amount ECU 112 is in failure. In this state, the first communication bus 120a is not functioning. However, the failure occurs in the auxiliary operation information obtaining system, and the dedicated communication line 124A, the dedicated communication line 124B, the second communication bus 120b, and the third communication bus 120c are functioning, so that the reaction force control executed by the reaction force ECUs 110 and the steering control executed by the steering ECUs 108 are not influenced.

FIG. 4E illustrates a state in which the steering ECU 108A is in failure. In this state, the dedicated communication line 124A and the first communication bus 120a are not functioning. The steering ECU 108B executes the steering ratio change control based on the vehicle speed information received from the brake ECU 52 via the third communication bus 120c. The reaction force ECU 110A and the reaction force ECU 110B execute the vehicle-speed-dependent reaction force control based on the vehicle speed information received from the brake ECU 52 via the second communication bus 120b or the third communication bus 120c. The reaction force ECU 110A executes the steering-load-dependent reaction force control based on the steering information received from the steering ECU 108B via the third communication bus 120c. In the present steering system, the steering information is information about the steering amount deviation $\Delta\theta$. This applies to the following explanation.

FIG. 4F illustrates a state in which the steering ECU 108B is in failure. In this state, the dedicated communication line 124B and the third communication bus 120c are not functioning. The steering ECU 108A executes the steering ratio change control based on the vehicle speed information received from the brake ECU 52 via the first communication bus 120a. The reaction force ECU 110A and the reaction force ECU 110B execute the vehicle-speed-dependent reaction force control based on the vehicle speed information received from the brake ECU 52 via the second communication bus 120*b*. There exist no communication paths for the reaction force ECU 110B to receive the steering information from the steering ECU 108A. Accordingly, the reaction force ECU 110B does not execute the steering-load-dependent reaction force control.

Figure 4G:
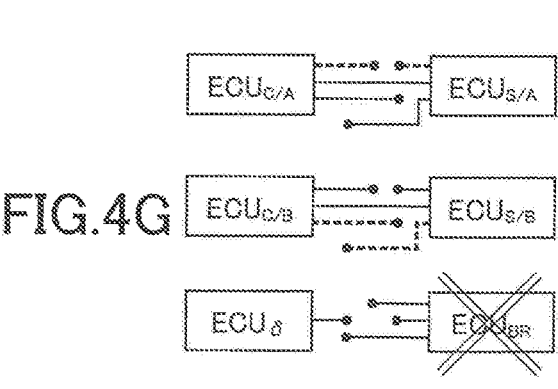
FIG. 4G is a schematic view for explaining a communication state among the electronic control units of the steering system according to the embodiment in the case where an electronic control unit of an auxiliary steering device is in failure.

FIG. 4G illustrates a state in which the brake ECU 52 is in failure. In this state, the two dedicated communication lines 124A, 124B are functioning whereas none of the three communication buses 120*a*, 120*b*, 120*c* are functioning. The reaction force ECU 110A and the reaction force ECU 110B execute the basic reaction force control and the steering-load-dependent reaction force control but do not execute the vehicle-speed-dependent reaction force control. The steering ECU 108A and the steering ECU 108B execute the basic steering control but do not execute the steering ratio change control.

Referring next to FIGS. 5B-5H and FIGS. 6I-6P, there will be explained cases in which two ECUs suffer from the failure involving the disordered transmission phenomenon. In the cases illustrated in FIGS. 5B-5H and FIGS. 6I-6P, the ECUs of mutually different combinations are in failure. As in FIGS. 4A-4G, illustration of the internal structure of each ECU is omitted in FIGS. 5A-5H and FIGS. 6I-6P. For reference sake, FIG. 5A illustrates a state in which none of the ECUs are in failure. In FIGS. 5B-5H and FIG. 6I-6P, two ECUs that are in failure are marked with "x", and the communication bus/buses 120 and the dedicated communication line/lines 124 that are not functioning are erased, that is, not illustrated.

FIG. 5B illustrates a state in which the reaction force ECU 110A and the steering ECU 108A of the A system are in failure. In this state, the dedicated communication line 124A, the first communication bus 120*a*, and the third communication bus 120*c* are not functioning. The B system is functioning, and the steering ECU 108B does not execute the steering ratio change control whereas the reaction force ECU 110B executes the vehicle-speed-dependent reaction force control based on the vehicle speed information received from the brake ECU 52 via the second communication bus 120*b*.

FIG. 5C illustrates a state in which the reaction force ECU 110B and the steering ECU 108B of the B system are in failure. In this state, the dedicated communication line 124B, the second communication bus 120*b*, and the third communication bus 120*c* are not functioning. The A system is functioning, and the reaction force ECU 110A does not execute the vehicle-speed-dependent reaction force control whereas the steering ECU 108A executes the steering ratio change control based on the vehicle speed information received from the brake ECU 52 via the first communication bus 120*a*.

FIG. 5D illustrates a state in which the operation amount ECU 112 that constitutes the auxiliary operation information obtaining system and the brake ECU 52 that constitutes the auxiliary wheel-steering system are in failure. In this state none of the first communication bus 120*a*, the second communication bus 120*b*, and the third communication bus 120*c* are not functioning. Though the A system and the B system are functioning, there exist no communication paths for the A system and the B system to receive the vehicle speed information. Accordingly, the reaction force ECU 110A and the reaction force ECU 110B do not execute the vehicle-speed-dependent reaction force control, and the steering ECU 108A and the steering ECU 108B do not execute the steering ratio change control.

FIG. 5E illustrates a state in which the reaction force ECU 110A and the reaction force ECU 110B as the two main operation information obtaining systems are both in failure. In this state, both the dedicated communication line 124A and the dedicated communication line 124B, the second communication bus 120*b*, and the third communication bus 120*c* are not functioning. Each of the steering ECU 108A and the steering ECU 108B executes: the basic steering control based on the operation information received from the operation amount ECU 112 as the auxiliary operation information obtaining system via the first communication bus 120*a*; and the steering ratio change control based on the vehicle speed information received from the brake ECU 52 via the first communication bus 120*a*.

FIG. 5F illustrates a state in which the steering ECU 108A and the steering ECU 108B as the two main wheel-steering systems are both in failure. In this state, the dedicated communication line 124A, both the dedicated communication 124B and the first communication bus 120*a*, and the third communication bus 120*c* are not functioning. In this state, the brake ECU 52 receives the operation information from the reaction force ECU 110B via the second communication bus 120*b*, and the brake system 18 works as the auxiliary wheel-steering system. The reaction force ECU 110A and the reaction force ECU 110B can execute the vehicle-speed-dependent reaction force control based on the vehicle speed information received from the brake ECU 52 via the second communication bus 120*b*.

FIG. 5G illustrates a state in which the reaction force ECU 110A of the A system and the steering ECU 108B of the B system are in failure. In this state, both the dedicated communication line 124A and the dedicated communication line 124B, and the third communication bus 120*c* are not functioning. In this state, the steering ECU 108A executes: the basic steering control based on the operation information received from the operation amount ECU 112 via the first communication bus 120*a*; and the steering ratio change control based on the vehicle speed information received from the brake ECU 52 via the first communication bus 120*a*. The reaction force ECU 110B executes the vehicle-speed-dependent reaction force control based on the vehicle speed information received from the brake ECU 52 via the second communication bus 120*b*.

FIG. 5H illustrates a state in which the reaction force ECU 110B of the B system and the steering ECU 108A of the A system are in failure. In this state, both the dedicated communication line 124A and the dedicated communication line 124B, the first communication bus 120*a*, and the second communication bus 120*b* are not functioning. In this state, the steering ECU 108B executes: the basic steering control based on the operation information received from the reaction force ECU 110A via the third communication bus 120*c*; and the steering ratio change control based on the vehicle speed information received from the brake ECU 52 via the third communication bus 120*c*. The reaction force ECU 110A executes the vehicle-speed-dependent reaction force control based on the vehicle speed information received from the brake ECU 52 via the third communication bus 120*c*.

FIG. 6I illustrates a state in which the reaction force ECU 110A and the operation amount ECU 112 are in failure. In this state, the dedicated communication line 124A, the first communication bus 120*a*, and the third communication bus 120*c* are not functioning. While the steering ECU 108A cannot execute the basic steering control, the B system is functioning. The steering ECU 108B cannot execute the steering ratio change control, but the reaction force ECU 110B executes the vehicle-speed-dependent reaction force control based on the vehicle speed information received from the brake ECU 52 via the second communication bus 120*b*.

FIG. 6J illustrates a state in which the reaction force ECU 110B and the operation amount ECU 112 are in failure. In this state, the dedicated communication line 124B, the first communication bus 120*a*, and the second communication bus 120*b* are not functioning. The steering ECU 108B executes the basic steering control based on the operation information received from the reaction force ECU 110A via the third communication bus 120*c*. The steering ECU 108A and the steering ECU 108B execute the steering ratio change control based on the vehicle speed information received from the brake ECU 52 via the third communication bus 120*c*. The reaction force ECU 110A executes the vehicle-speed-dependent reaction force control based on the vehicle speed information received from the brake ECU 52 via the third communication bus 120*c*.

FIG. 6K illustrates a state in which the steering ECU 108A and the operation amount ECU 112 are in failure. In this state, the dedicated communication line 124A and the first communication bus 120*a* are not functioning. The B system is functioning, and the steering ECU 108B executes the steering ratio change control based on the vehicle speed information received from the brake ECU 52 via the third communication bus 120*c*. The reaction force ECU 110A and the reaction force ECU 110B execute the vehicle-speed-dependent reaction force control based on the vehicle speed information received from the brake ECU 52 via the second communication bus 120*b* or the third communication bus 120*c*.

FIG. 6L illustrates a state in which the steering ECU 108B and the operation amount ECU 112 are in failure. In this state, the dedicated communication line 124B, the first communication bus 120*a*, and the third communication bus 120*c* are not functioning. There exist no communication paths for the steering ECU 108A to receive the vehicle speed information from the brake ECU 52. Accordingly, the steering ECU 108A does not execute the steering ratio change control. On the other hand, the reaction force ECU 110A and the reaction force ECU 110B execute the vehicle-speed-dependent reaction force control based on the vehicle speed information received from the brake ECU 52 via the second communication bus 120*b*.

FIG. 6M illustrates a state in which the reaction force ECU 110A and the brake ECU 52 are in failure. In this state, the dedicated communication line 124A and the three communication buses, i.e., the first communication bus 120*a*, the second communication bus 120*b*, and the third communication bus 120*c*, are not functioning. The steering ECU 108A cannot execute the basic steering control but the B system is functioning. Because the vehicle speed information is not available, the reaction force ECU 110B does not execute the vehicle-speed-dependent reaction force control and the steering ECU 108B does not execute the steering ratio change control.

FIG. 6N illustrates a state in which the reaction force ECU 110B and the brake ECU 52 are in failure. In this state, the dedicated communication line 124B and the three communication buses, i.e., the first communication bus 120*a*, the second communication bus 120*b*, and the third communication bus 120*c*, are not functioning. The steering ECU 108B cannot execute the basis steering control but the A system is functioning. Because the vehicle speed information is not available, the reaction force ECU 110A does not execute the vehicle-speed-dependent reaction force control and the steering ECU 108A does not execute the steering ratio change control.

FIG. 6O illustrates a state in which the steering ECU 108A and the brake ECU 52 are in failure. In this state, the dedicated communication line 124A and the three communication buses, i.e., the first communication bus 120*a*, the second communication bus 120*b*, and the third communication bus 120*c*, are not functioning. Because the vehicle speed information is not available the reaction force ECU 110B does not execute the vehicle-speed-dependent reaction force control and the steering ECU 108B does not execute the steering ratio change control.

FIG. 6P illustrates a state in which the steering ECU 108B and the brake ECU 52 are in failure. In this state, the dedicated communication line 124B and the three communication buses, i.e., the first communication bus 120*a*, the second communication bus 120*b*, and the third communication bus 120*c*, are not functioning. Because the vehicle speed information is not available, the reaction force ECU 110A does not execute the vehicle-speed-dependent reaction force control and the steering ECU 108A does not execute the steering ratio change control.

There have been explained all cases in which one or two of the ECUs among the three ECUs 110A, 110B, 112 each as the operation information obtaining system and the three ECUs 108A, 108B, 52 each as the wheel-steering system suffer from the failure involving the disordered transmission phenomenon. Further, it has been explained, for all the cases, how communication among non-failure ECUs is ensured and how the vehicle steering system 14 operates. As apparent from the above explanation, in any of the cases, the operation of at least one of the three wheel-steering systems including the auxiliary wheel-steering system enables the direction of the vehicle to be changed in accordance with the operation amount δ of the steering wheel 60. Thus, the present vehicle steering system 14 is constructed as a steer-by-wire steering system excellent from the viewpoint of failsafe.

F. Modifications

In the vehicle steering system 14 of the illustrated embodiment, the connection between: the reaction force ECUs 110A, 110B and the steering ECUs 108A, 108B; and the first through the third communication buses 120*a*-120*c* is configured such that communication via one of the three ports in each of the reaction force ECUs 110A, 110B and the steering ECUs 108A, 108B is the one-way communication explained above, in view of the failure that involves the disordered transmission phenomenon. The number of the ports for the one-way communication may be freely determined at design time. Further, it may be freely determined at design time which port or ports of the ECUs are used for the one-way communication.

The vehicle steering system 14 of the illustrated embodiment employs, in addition to the first communication bus 120*a*, the second communication bus 120*b* and the third communication bus 120*c*. That is, three communication buses in total are provided in the vehicle steering system 14. The number of the communication buses may be changed, that is, may be increased or decreased, depending on what function the steering system has to exert in the case where any one or two of the ECUs fail to operate, namely, depending on to what extent the steering system has to exert a function that is attained by the additional controls such as the vehicle-speed-dependent reaction force control, the steering-load-dependent reaction force control, and the steering ratio change control, or depending on to what extent the disordered transmission phenomenon has to be coped with.

Figure 7:
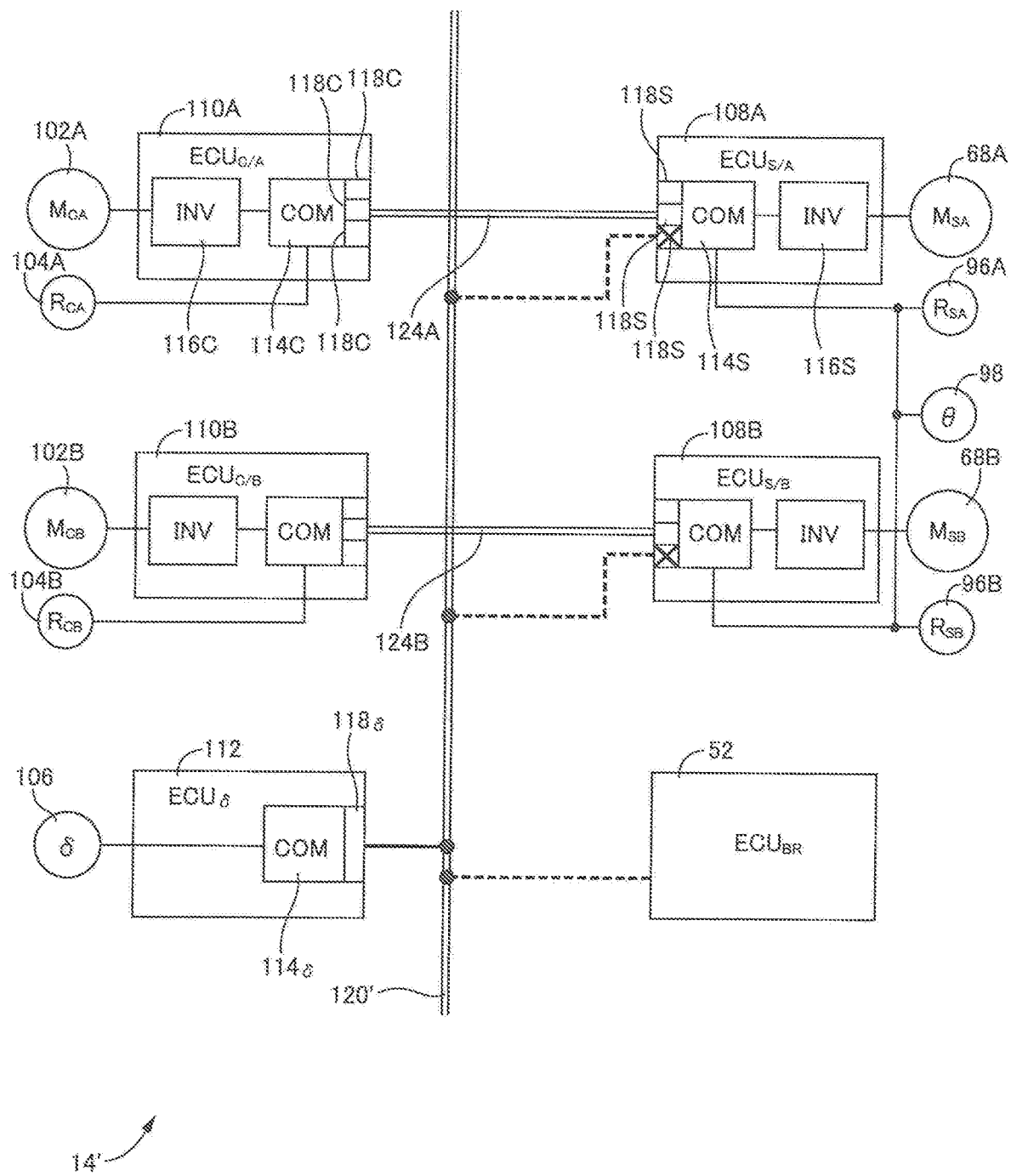
FIG. 7 is a block diagram illustrating a configuration relating to the control of the steering system according to a modification.

For instance, the vehicle steering system may be configured as illustrated in FIG. 7. A vehicle steering system 14' illustrated in FIG. 7 includes only one communication bus 120'. In this configuration, the operation amount ECU 112, the steering ECU 108A, the steering ECU 108B, and the brake ECU 52 may be connected to the communication bus 120'. In the case where any two of the ECUs of the vehicle steering system 14' having such a simplified structure suffer from a failure not involving the disordered transmission phenomenon, the direction of the vehicle 10 can be changed in accordance with the operation amount δ of the steering wheel 60. When taking the disordered transmission phenomenon into consideration, the vehicle steering system may be configured, like the vehicle steering system 14', such that communication between: the steering ECU 108A, the steering ECU 108B, and the brake ECU 52; and the communication bus 120' is the one-way communication in which the information is not allowed to flow from the ECUs to the communication bus 120' while the information is available from the communication bus 120'.

What is claimed is:

1. A steer-by-wire steering system, comprising:
    an operation member to be operated by a driver;
    a two-system reaction force applying device including two reaction force controllers and first and second sensors corresponding to two systems, the reaction force applying device being configured to, in each of the two systems, obtain operation information that is information relating to an operation degree of the operation member using one of the first and second sensors and apply an operation reaction force to the operation member based on the operation information;
    a two-system steering device including two steering controllers corresponding to two systems, the steering device being configured to, in each of the two systems, steer a wheel based on the operation information;
    an operation information obtaining device configured to obtain the operation information relating to the operation degree of the operation member independently of the reaction force applying device using a third sensor;
    an auxiliary steering device capable of changing a direction of a vehicle on which the steer-by-wire steering system is installed, independently of the steering device;
    two dedicated communication lines one of which information-transmittably and information-receivably connects one of the two reaction force controllers and one of the two steering controllers to each other, and the other of which information-transmittably and information-receivably connects the other of the two reaction force controllers and the other of the two steering controllers to each other; and
    a first communication bus to which the operation information obtaining device is at least information-transmittably connected and to which the two steering controllers and the auxiliary steering device are at least information-receivably connected.

2. The steer-by-wire steering system according to claim 1, wherein at least one of the two steering controllers is information-untransmittably connected to the first communication bus.

3. The steer-by-wire steering system according to claim 1, further comprising a second communication bus to which each of the two reaction force controllers and the auxiliary steering device are connected.

4. The steer-by-wire steering system according to claim 3, wherein at least one of the two reaction force controllers is information-untransmittably connected to the second communication bus.

5. The steer-by-wire steering system according to claim 1, further comprising a third communication bus to which each of the two reaction force controllers, each of the two steering controllers, and the auxiliary steering device are connected.

6. The steer-by-wire steering system according to claim 5, wherein at least one of: at least one of the two reaction force controllers; and at least one of the two steering controllers is information-untransmittably connected to the third communication bus.

7. The steer-by-wire steering system according to claim 1, further comprising: a second communication bus to which each of the two reaction force controllers and the auxiliary steering device are connected; and a third communication bus to which each of the two reaction force controllers, each of the two steering controllers, and the auxiliary steering device are connected,
    wherein one of the two steering controllers is information-untransmittably connected to the first communication bus and information-transmittably and information-receivably connected to the third communication bus while the other of the two steering controllers is information-transmittably and information-receivably connected to the first communication bus and information-untransmittably connected to the third communication bus, and
    wherein one of the two reaction force controllers is information-untransmittably connected to the second communication bus and information-transmittably and information-receivably connected to the third communication bus while the other of the two reaction force controllers is information-transmittably and information-receivably connected to the second communication bus and information-untransmittably connected to the third communication bus.

8. The steer-by-wire steering system according to claim 1, wherein the auxiliary steering device is a brake system installed on the vehicle on which the steer-by-wire steering system is installed and capable of applying a braking force to right and left wheels independently of each other.

9. The steer-by-wire steering system according to claim 1, wherein the two-system steering device is configured to, in each of the two systems, obtain steering information that is information relating to a steering degree of the wheel, and
    wherein the two-system reaction force applying device is configured to, in each of the two systems, control the operation reaction force based on the steering information.

10. The steer-by-wire steering system according to claim 1, wherein the two-system reaction force applying device is configured to, in each of the two systems, control the operation reaction force based on vehicle speed information that is information relating to a running speed of the vehicle on which the steer-by-wire steering system is installed, and/or the two-system steering device is configured to, in each of the two systems, control a steering degree of the wheel based on the vehicle speed information that is information relating to the running speed of the vehicle on which the steer-by-wire steering system is installed.

11. The steer-by-wire steering system according to claim 10, which is configured such that the vehicle speed information flows through the first communication bus.

12. The steer-by-wire steering system according to claim 10, further comprising a second communication bus to which each of the two reaction force controllers and the auxiliary steering device are connected, the steer-by-wire steering system being configured such that the vehicle speed information flows through the second communication bus.

13. The steer-by-wire steering system according to claim 10, further comprising a third communication bus to which each of the two reaction force controllers, each of the two steering controllers, and the auxiliary steering device are connected, the steer-by-wire steering system being configured such that the vehicle speed information flows through the third communication bus.

14. The steer-by-wire steering system according to claim 10, wherein the vehicle speed information contains information sent from a brake system installed on the vehicle on which the steer-by-wire steering system is installed.

15. The steer-by-wire steering system according to claim 10, wherein the vehicle speed information contains information sent from a vehicle drive system installed on the vehicle on which the steer-by-wire steering system is installed.

16. The steer-by-wire steering system according to claim 1, wherein each of the first and second sensors detects a rotation angle of a motor shaft of a reaction force motor, and the third sensor directly detects a rotation degree of the operation member.

17. The steer-by-wire steering system according to claim 1, wherein the third sensor is an absolute angle sensor.

* * * * *